US006373486B1

(12) United States Patent
Simpson

(10) Patent No.: US 6,373,486 B1
(45) Date of Patent: *Apr. 16, 2002

(54) METHOD AND APPARATUS FOR CREATING REPRESENTATIONS OF GEOLOGIC SHAPES

(75) Inventor: Anne L. Simpson, Houston, TX (US)

(73) Assignee: Landmark Graphics Corporation, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/017,531

(22) Filed: Feb. 2, 1998

Related U.S. Application Data

(60) Provisional application No. 60/037,235, filed on Feb. 3, 1997.

(51) Int. Cl.$^7$ .............................................. G06T 15/30
(52) U.S. Cl. ........................ 345/423; 345/420; 345/440
(58) Field of Search ................................ 345/420, 440, 345/423

(56) References Cited

U.S. PATENT DOCUMENTS 4,930,092 A * 5/1990 Reilly ......................... 345/423

\* cited by examiner

*Primary Examiner*—Mark Zimmerman
*Assistant Examiner*—Philip Stevenson
(74) *Attorney, Agent, or Firm*—Gary L. Bush; Andrews, Kurth, Mayor, Day, Caldwell & Keeton

(57) ABSTRACT

A method for filling the space between two neighboring polyline ribs is disclosed. The method, called ladder triangulation, likens two ribs, which generally outline a complex structure, to the two rails of a ladder. The ladder triangulation is built by adding rungs, each rung connecting a node on one rib to a node on the other rib and thereby (after the first rung) creating one more triangle. In essence the first rung connects node 1 of polyline 1 to node 1 of polyline 2, and the second rung connects either node 1 polyline 1 to node 2 polyline 2 or else node 1 polyline 2 to node 2 polyline 1, whichever rung is shorter. There are (n1+n2)/2 such rungs where n1 and n2 are the respective node counts of the two polylines, and computation is linear with node count. Where there are multiple polylines, the same process is repeated between polylines 2 and 3, 3 and 4, etc. and may also be repeated between the last polyline and the first one (cyclic rib fill). The entire set of ribs is filled in time proportional to the total node count. Moreover, if a single rib is subsequently modified by an editing process, a triangulation can be updated rapidly by recomputation of just the two ladder triangulations involving that rib.

26 Claims, 42 Drawing Sheets

METHOD AND APPARATUS FOR CREATING REPRESENTATIONS OF GEOLOGIC SHAPES

CROSS REFERENCE TO RELATED PROVISIONAL APPLICATION

This application claims the benefit of U.S. Provisional Application No. 60/037,235 filed Feb.3, 1997.

Two microfiche appendices are part of this application. A first appendix, called Appendix I, includes 98 frames. A second appendix, called Appendix II includes 69 frames.

BACKGROUND OF THE INVENTION

1. Field of the Invention

This invention concerns methods and apparatus for processing seismic data to display subterranean geologic formations, specifically complex formations. In particular the invention relates to computer implemented triangulation methods for generating representations of complex shapes form seismic data.

2. Description of the Prior Art

SeisWorks, a computer process of software of Landmark Graphics Corporation, allows the creation of single-valued horizon surfaces and of triangulated fault surfaces, but is mute regarding other surfaces of geologic interest such as saltdomes, stream channels, and lenses. The SeisWorks approach to fault surfaces fails to handle the more complex geologic shapes.

Landmark's SeisWorks fault triangulation method is based on the Thiessen or Delaunay algorithm which requires that the fault be a single-valued surface in the triangulating coordinate system. To meet this condition in cases where a fault is multivalued with respect to the x,y plane, the present SeisWorks method begins with a determination of a natural coordinate system for any given set of segments. This system is such that the u,v coordinates lie in a plane which best fits the segment data, a condition which will usually result in the required single-valuedness.

However, for saltdomes, lenses, stream meanders, etc., there is no rotation of x,y,z for which the surface is single-valued, and the Thiessen approach must be applied piecemeal if indeed it is worth applying at all.

SUMMARY OF THE INVENTION

In reality a different approach is needed, and this approach can be supplied by Rib Technology, the creation of triangulated surfaces based on orderable sets of ribs, 3D polylines which are quasi parallel to their neighbors.

By combining this technology with appropriate workflows for gathering ribs (pseudo-fault segments), it is already possible to obtain triangulated surfaces of saltdomes and other complex shapes from SeisWorks. Moreover, the same concepts can be applied to fault triangulation with results that will be faster to obtain and superior in quality to those from the Thiessen method.

Rib Technology adds significantly to the surface production capabilities of SeisWorks with respect to complex shapes of geologic importance hitherto untreatable. It may totally supplant SeisWorks'present approach to the representation of fault surfaces because of its superior results and faster computation time. Furthermore it is capable to support horizon surface production in cases where the single-valued horizon surface assumption fails.

This same technology also enhances SeisWorks surface editing capability, which is presently an all-or-nothing proposition (if a fault segment is touched, the entire fault surface is invalidated and recomputed from scratch when next accessed), by enabling localized surface editing.

Additionally, by providing an ordering in one direction by rib index and in another by node index, this method leads directly to parametric coordinates and to useful surface representations other than triangulations such as smooth bi-cubic surface patches.

BRIEF DESCRIPTION OF THE DRAWINGS

The objects, advantages and features of the invention will become more apparent by reference to the drawings which are appended hereto and wherein like numerals indicate like elements and wherein an illustrative embodiment of the invention is shown, of which.

List of Figures.

DESCRIPTION OF PREFERRED EMBODIMENTS OF THE INVENTION

Figure 1:
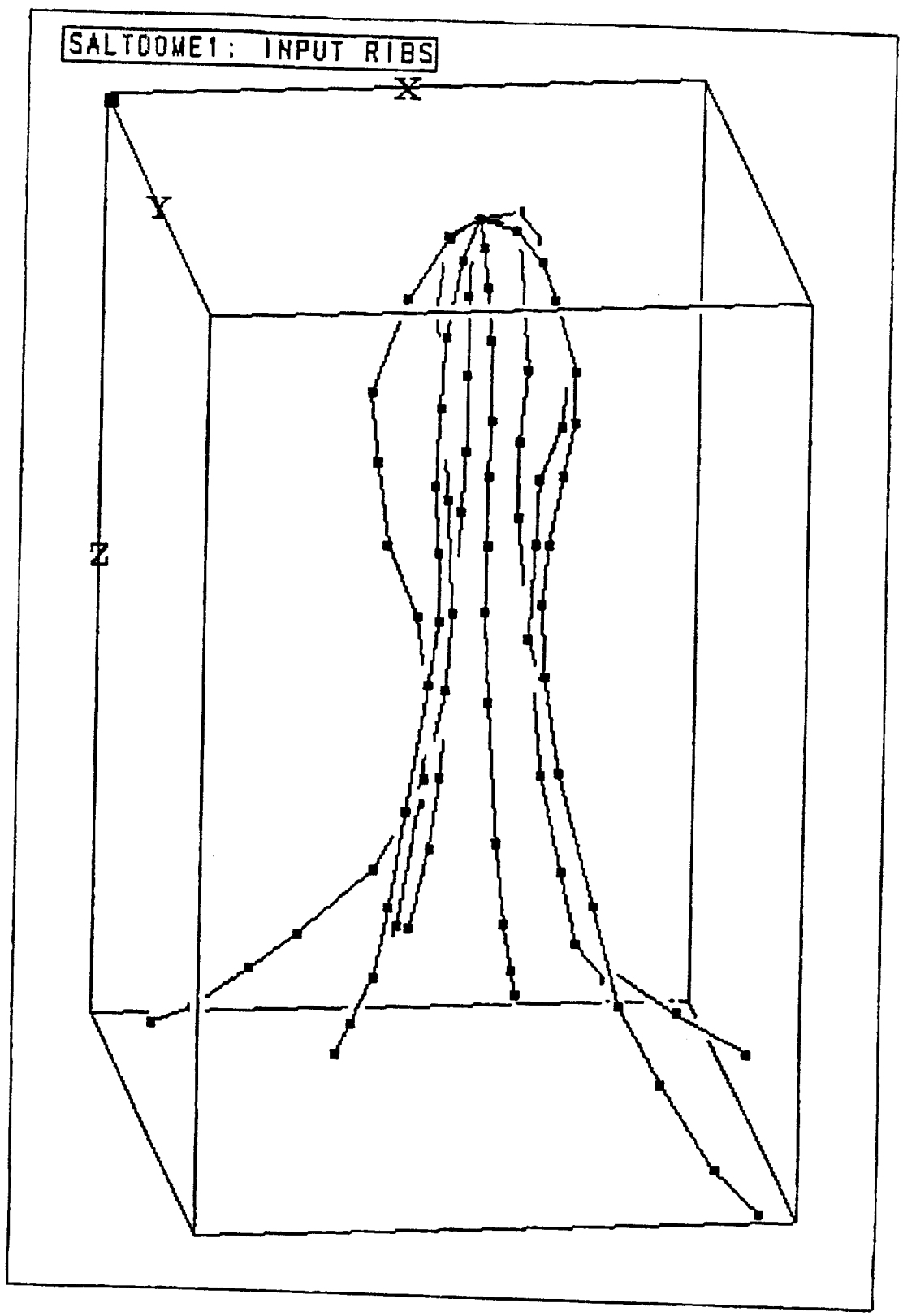
FIG. 1. Shows saltdome ribs from four radial sections.

The space between two neighboring polyline ribs can be filled, i.e., triangulated, easily by a technique called here "ladder triangulation". The two ribs are likened to the two rails of a ladder. The ladder triangulation is built by adding rungs, each rung connecting a node on one rib to a node on the other rib and thereby (after the first rung) creating one more triangle. In essence the first rung connects node 1 of polyline 1 to node 1 of polyline 2, and the second rung connects either node 1 of polyline 1 to node 2 polyline 2 or else node 1 polyline 2 to node 2 of polyline 1, whichever rung is shorter. Rung addition is continued this way with binary choices until the last rung connects the two last nodes. There will be (n1+n2)/2 such rungs where n1 and n2 are the respective node counts of the two polylines, and computation is obviously linear in the node count.

The same process is repeated between polylines 2 and 3, 3 and 4, etc. and may also be repeated between the last polyline and the first one (cyclic rib fill). The entire set of ribs is filled in time proportional to the total node count. Moreover, if a single rib is subsequently modified by an editing process, a triangulation can be updated rapidly by recomputation of just the two ladder triangulations involving that rib.

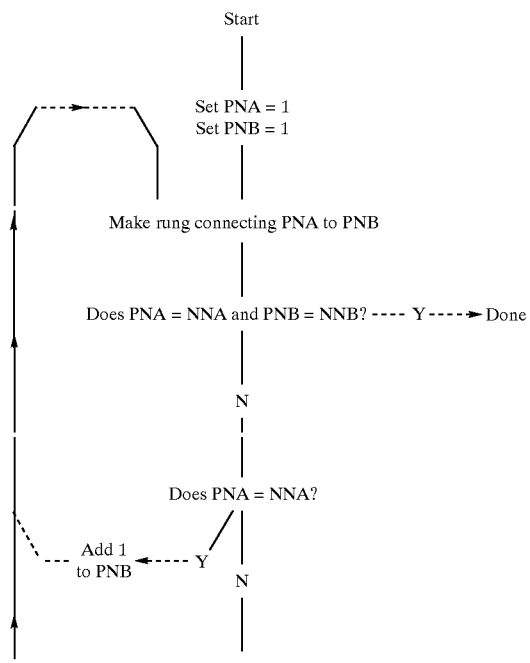

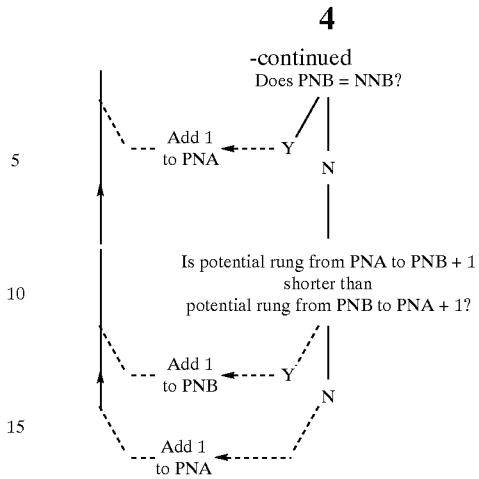

A computer program written in ANSI C programming language for the Ladder Triangulation Process is attached as an appendix called APPENDIX I at the end of this specification.

The present method consists of a standalone program called RibFill, written in a manner analogous to the utility HorizonFill described in Landmark's technical newsletter UserNet of March/April 1996 and May/June 1996. A copy of the source code of RibFill is attached as APPENDIX II at the end of this specification.

RibFill reads ribs from an ASCII file as created by exporting fault segments from SeisWorks in the default "fault.data" format. It decides how to proceed based on an examination of the ribs presented and on command-line options. The ribs may be re-ordered and subjected to editing changes prior to application of the ladder triangulation. An option for graphical review and hard copy output of the results is provided. Optionally the revised ribs may be written back out in "fault.data" format, and the triangulation written out as an ASCII file in GOCAD "Tsurf" format.

2. ILLUSTRATIVE APPLICATIONS

A dozen case studies of ribset triangulation are presented below.

Sections 2.1, 2.2, and 2.3 illustrate three alternative ways of creating triangulatable ribs for real saltdomes.

Section 2.4 shows the treatment of a small section of a stream channel in real data.

The study in Section 2.5 is that of a torus shape such as a stream channel which flows around into itself or more realistically some halo-shaped distribution associated with the splash of a meteorite.

Sections 2.6 and 2.7 exercise rib technology with respect to two notorious topologic oddities: the non-orientable surfaces known as Moebius strips and Klein bottles.

The approach necessary to create a Klein bottle surface provides a clue to tackling a surface representation in the vicinity of a volcano, which is illustrated in Section 2.8.

In Section 2.9 the capture of fan lenses is illustrated wherein lies a rather subtle problem connected with abrupt changes in rib direction, a problem which is solved by the introduction of the concept of constrained nodes.

Section 2.10 presents the triangulation of an artificial recumbent fold, and suggests how such a shape might be appended to a better-behaved part of a horizon surface.

In Section 2.11 a real, but simple fault is rib-triangulated, with discussion of advantages of this invention vis-a-vis the Thiessen triangulation presently used in SeisWorks.

Finally Section 2.12 examines a complex fault case with sharp bending of strike of fault and corresponding violation of the "approximate parallelism" requirement for neighboring ribs. The solution discussed but not illustrated is to rerib part or all of the data so as to force satisfaction of this requirement.

Graphics

For each of these case studies first the input ribs as shown, then the ladder triangulation of the ribs and finally a contouring of the triangulation giving a reasonable sense of the shape captured by the process. The diagrams utilize a Gapped Hidden Line Removal algorithm which gives a 3D sense and a transparency to the depiction. In most cases the object is surrounded with a coordinate box defining axes. The large square dot at a corner of the box indicates a coordinate origin. By default, x,y,z is taken to be a right-handed system with z downward.

2.1 Salt Dome by Radial Section Ribbing

Ribs

Four vertical seismic sections pivoted at 45 degree increments about a vertical pivot line through the center of a saltdome are examined. On each section two "fault" segments are drawn, one starting at the top center of the dome and tracing the dome on the left side of the pivot line, and the other starting at the top center of the dome but tracing the dome on the right side of the pivot line. This results in eight "fault" segments input to RibFill in random sequence, as illustrated in FIG. 1.

Processing

RibFill first discovered that all eight of the input segments lay in vertical planes. It computed all the lines of intersection of non-parallel pairs of planes and found out that, within a tolerance, they were all the same. Hence it decided that these were rotating sections.

It determined that the first node points of all the ribs were, within a tolerance, the same, and that this point lay on the pivot line. Hence it replaced all the first node points with a point having x,y coordinates the same as the pivot line, and a z coordinate equal to the average z of the first node points.

For rotating sections, the program uses rib angle as the sequencing parameter. It produced a sequencing on the ribs so that the angle between rib 1 and rib 8 was a minimum. It measured the angle from rib 8 back to rib 1 and decided that this is a cyclic rib fill (there is a requirement to triangulate between ribs 8 and 1 and well as between the other 7 pairs of ribs), because that angle was approximately the same as the average angular increment between successive ribs.

Figure 2:
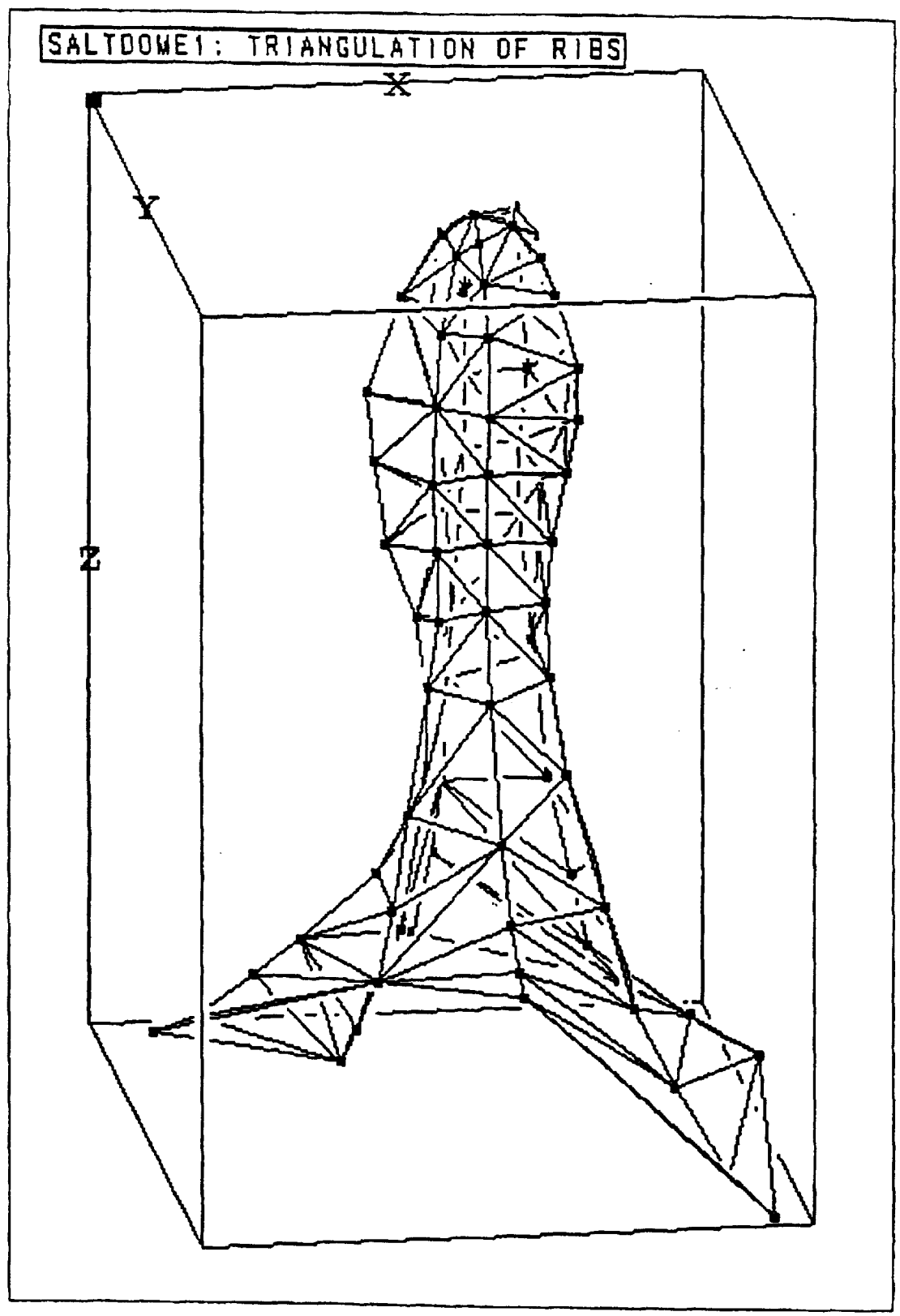
FIG. 2 Shows showing triangulation of radial section ribs.
Figure 3:
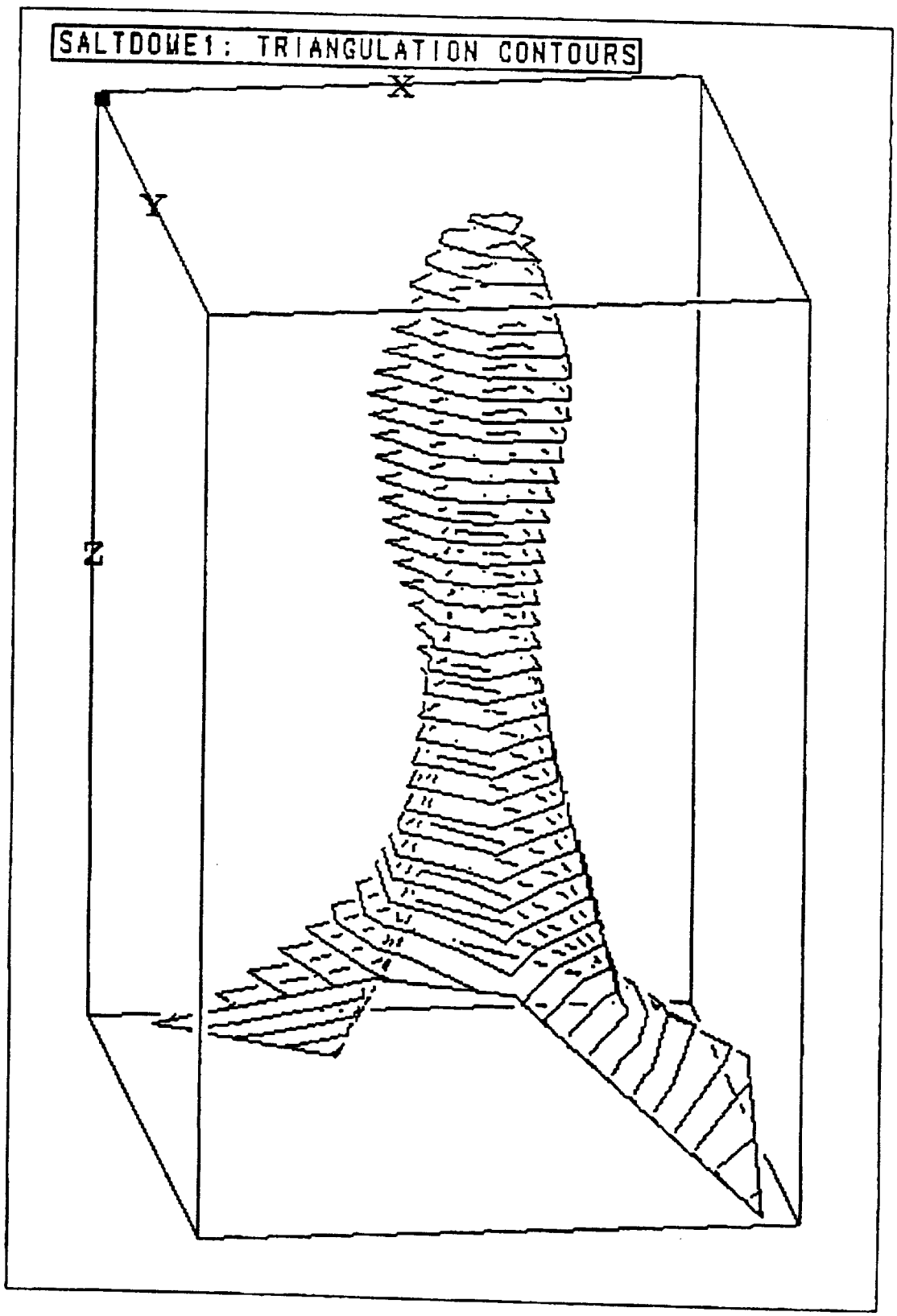
FIG. 3 Shows contouring of radial section triangulation.

FIG. 2 shows the ladder triangulation between all of the eight neighboring pairs of ribs, and FIG. 3 shows a contouring of the triangulated rib surface with contour planes perpendicular to the z axis.

Comments

This is the first of three techniques of this invention available for saltdome surface determinations. Radial sectioning is particularly applicable for complex, mushroom-type overhangs of the dome (which is not the case in this example), but will get into trouble for severely tilted domes (no suitable vertical pivot line). An intended RibFill upgrade to treat this situation is the enabling of slanted pivot lines.

2.2 Saltdome by Parallel Vertical Sections

Ribs

Figure 4:
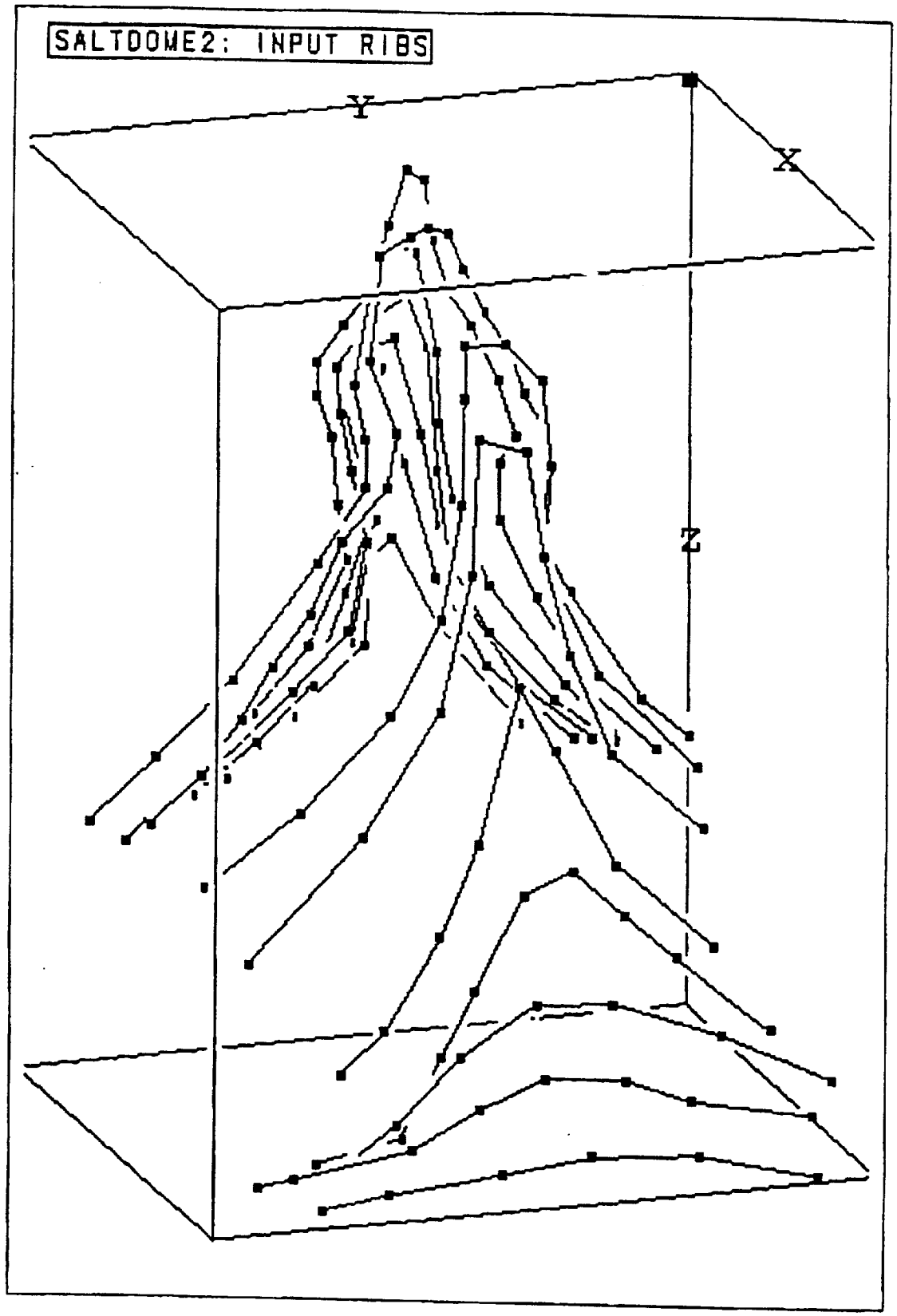
FIG. 4 Shows saltdome ribs from constant x sections.

Thirteen vertical seismic sections of a saltdome structure were taken, all such sections being perpendicular to the x axis. On each section, one "fault segment" was drawn tracing the dome from the bottom on one side of the section up over the top of the dome and down to its bottom on the other side of the section. The z coordinates of these segments can be, and some cases were, multivalued functions of the y coordinate. They are shown in FIG. 4.

Processing

Figure 5:
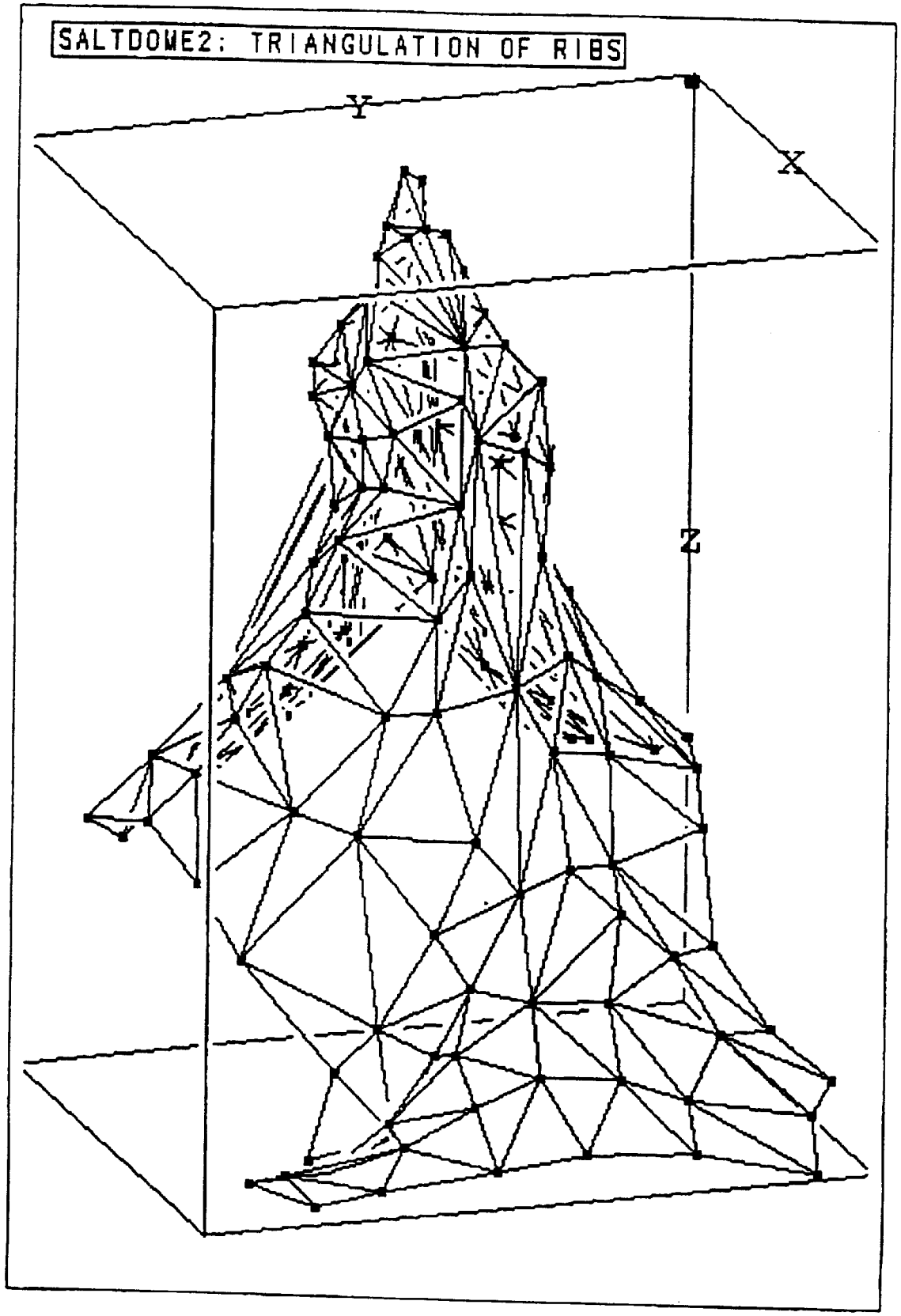
FIG. 5 Shows triangulation of constant x ribs.
Figure 6:
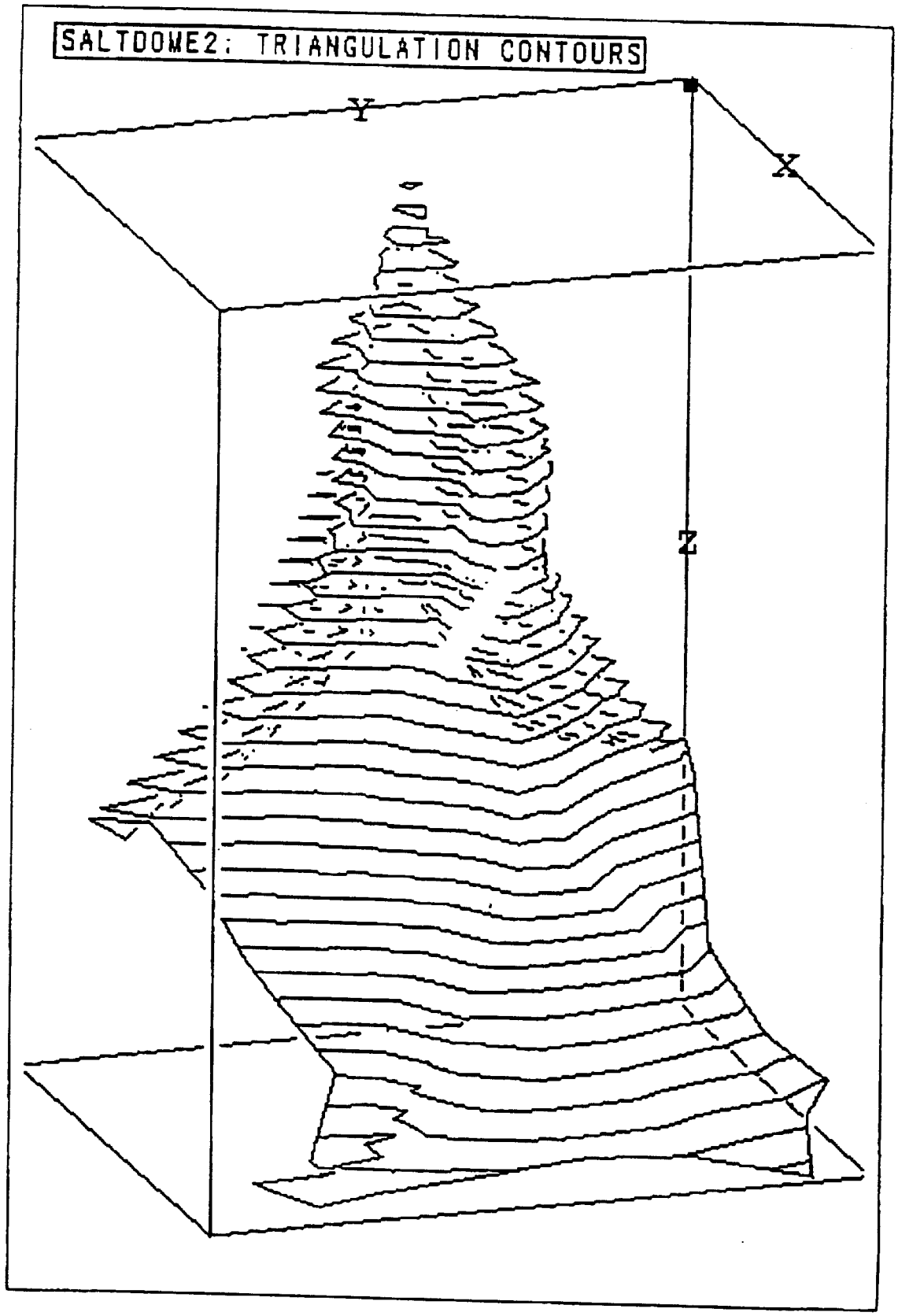
FIG. 6 Shows contouring of constant x triangulation.

RibFill first discovered that all the nodes in each of the input segments had a constant x coordinate, and hence used that coordinate as the sequencing parameter. There was no possibility in this case that a cyclic rib fill was wanted, since any section beyond the last rib must have an x coordinate greater than that of the first rib. After sorting, the program had to determine proper "node alignment". For example some ribs might have been drawn starting from the bottom left of the section and some starting from the bottom right. Thus the program successively examines ribs 2,3 ... 13, and makes a determination as to whether the rib is properly aligned with the previous rib or whether the ordering of the nodes in the rib should be reversed. The present test is to ladder triangulate with and without reversing one of the ribs and to choose the situation with the smallest sum of rung lengths. If reversal is needed, it is performed, and attention is then turned to the next rib. The ribset is then ready for ladder triangulation. The result is shown in FIG. 5. FIG. 6 shows a contouring (constant z levels) of this triangulation. The first and last ribs plus the first and last rungs of each ladder form a closed polygon describing the edge of the surface.

Comments

Drawing ribs on parallel vertical seismic sections is the second of three techniques for saltdome surface creation. The technique gets into trouble if the saltdome shows overhang in sections at right angles to the chosen sectioning. In this case no overhang exists for constant y sections. If overhang did exist, then some constant x sections could no longer be described by a single rib. Another direction for sectioning must be chosen or one of the other two approaches must be used.

2.3 Saltdome by Time Slice Ribbing

Ribs

Figure 7:
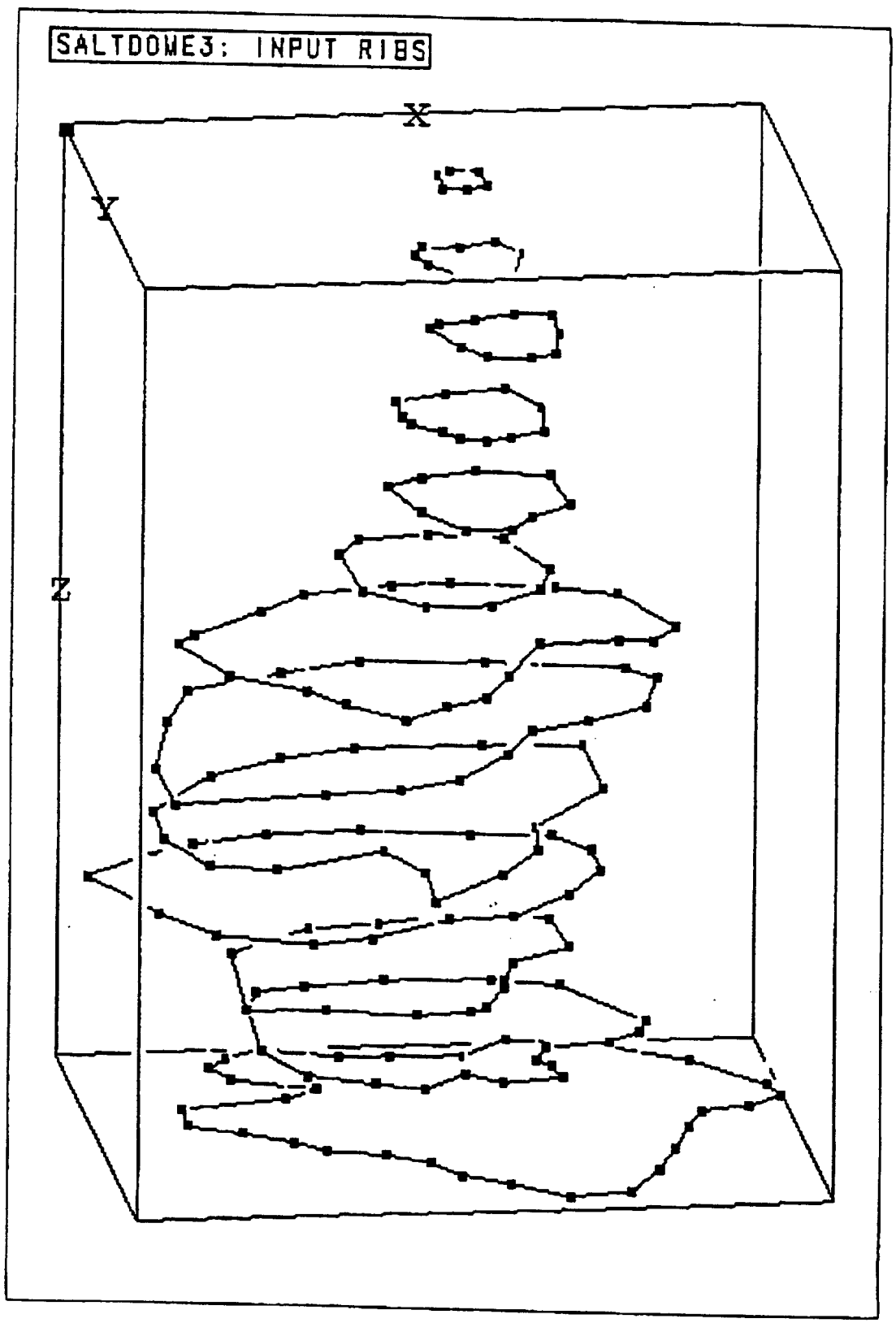
FIG. 7 Shows saltdome ribs from time slices.

Thirteen timeslice seismic sections of a saltdome were examined. An approximately closed polygon was drawn on each section to serve as ribs for this approach. FIG. 7 shows these 13 ribs.

Processing

Figure 8:
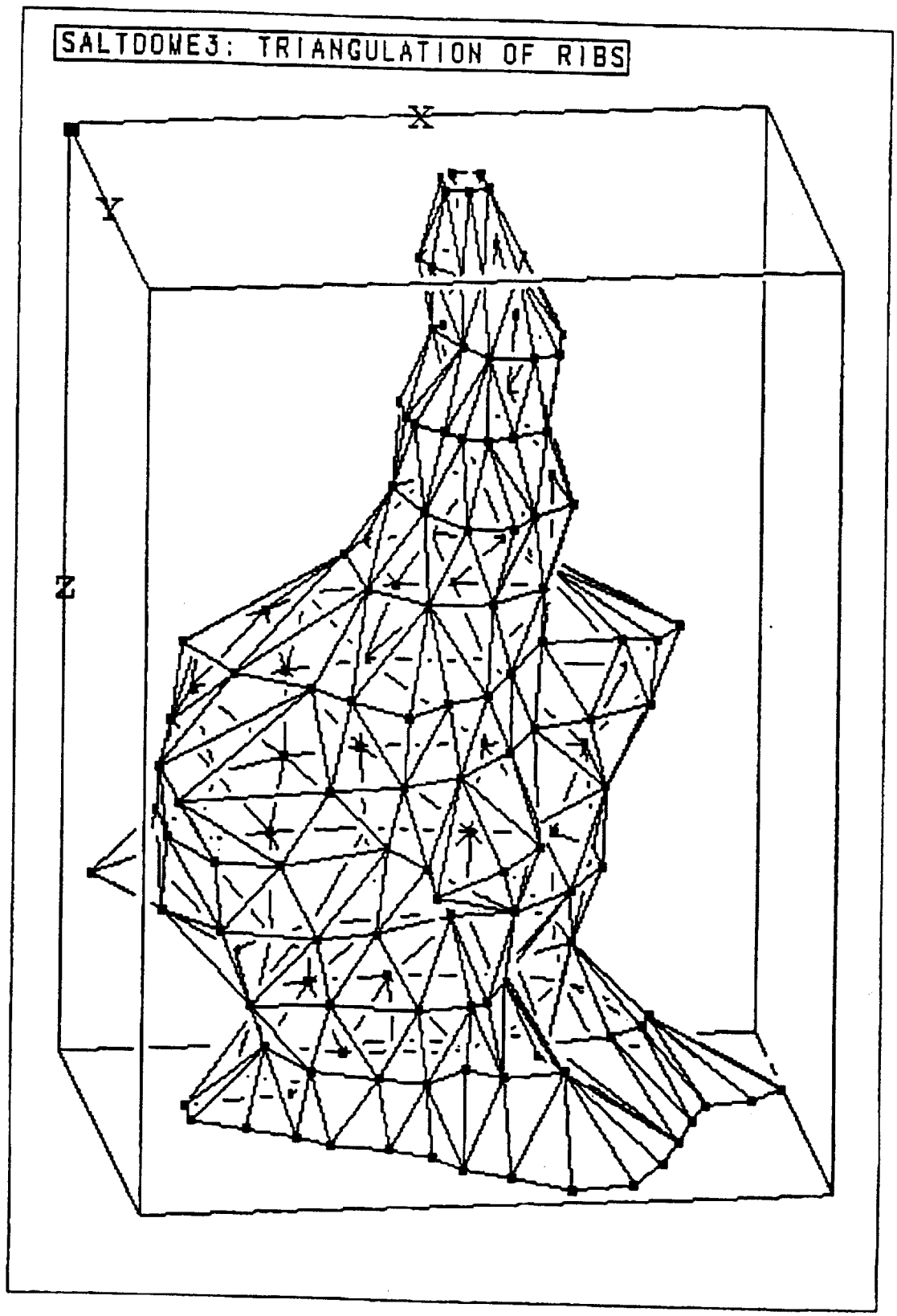
FIG. 8 Shows triangulation of time slice ribs.
Figure 9:
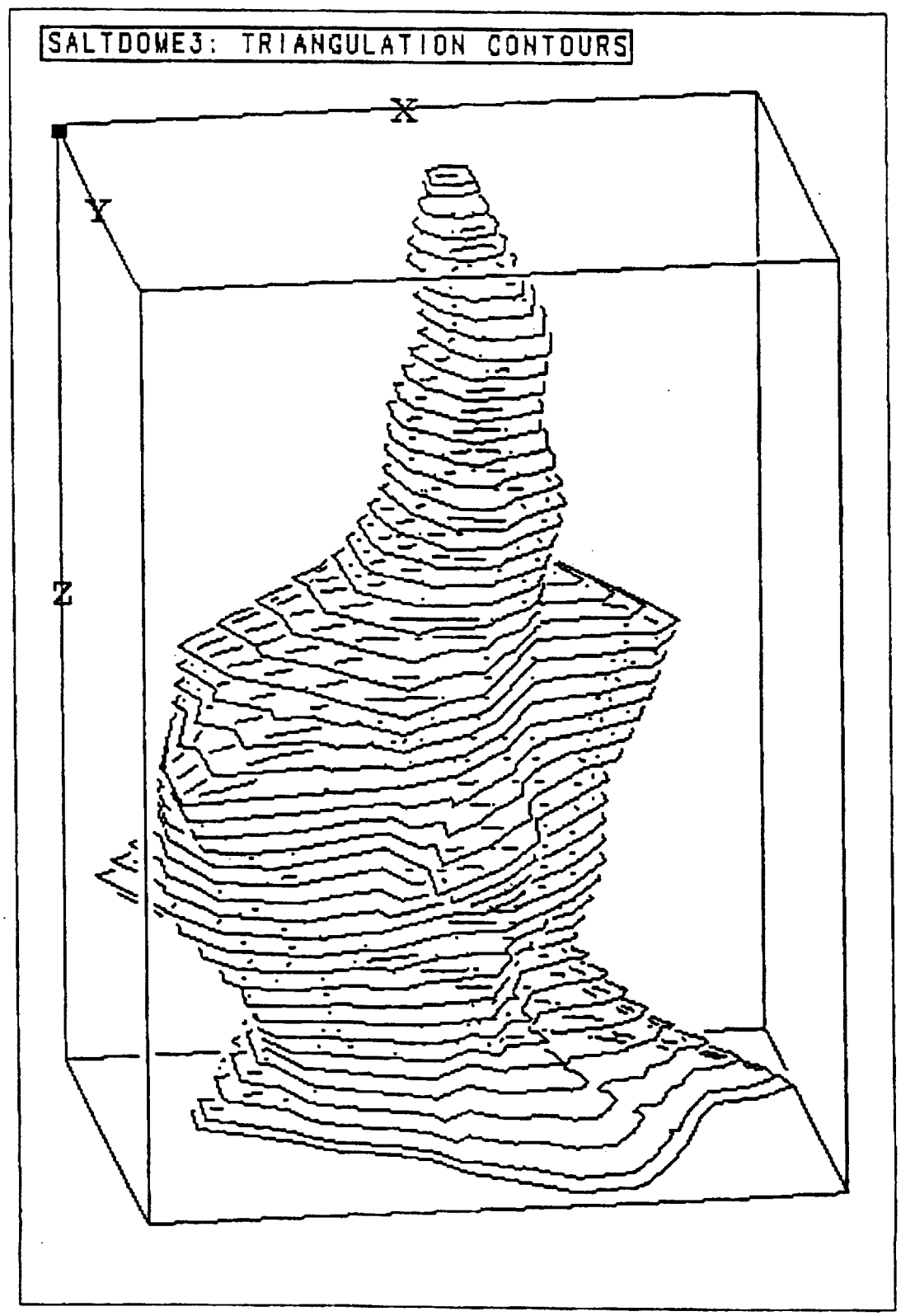
FIG. 9 Shows contouring of time slice triangulation.

RibFill first discovered that for each segment all of its nodes had the same z coordinate, i.e., that each rib lay in a horizontal plane. Hence it obtained a proper sequencing of the ribs by sorting them according to increasing z coordinate. Cyclic ribfill was ruled out since connecting rib 13 to rib 1 would violate the monotone order of the sequencing parameter. Next, RibFill discovered that for each rib the first and last node had, within a tolerance, the same x and y coordinates. Hence it decided that every rib was a closed polygon, and proceeded to replace each first and last node by the mean value of the two nodes. The issue of possibly reversing node order in this case is treated by computing the signed area of each polygon. Reversal is performed whenever the sign of the area of one polygon is opposite to that of the adjacent polygon. The resulting triangulation is shown in FIG. 8, and the corresponding contours in FIG. 9.

Comments

This is the third of three techniques available for saltdome surface creation. It should be applicable whenever each saltdome time slice section is one simply connected polygon. Of course, part of the polygon closure could run along the data boundary.

2.4 Stream Channel

Ribs

Figure 10:
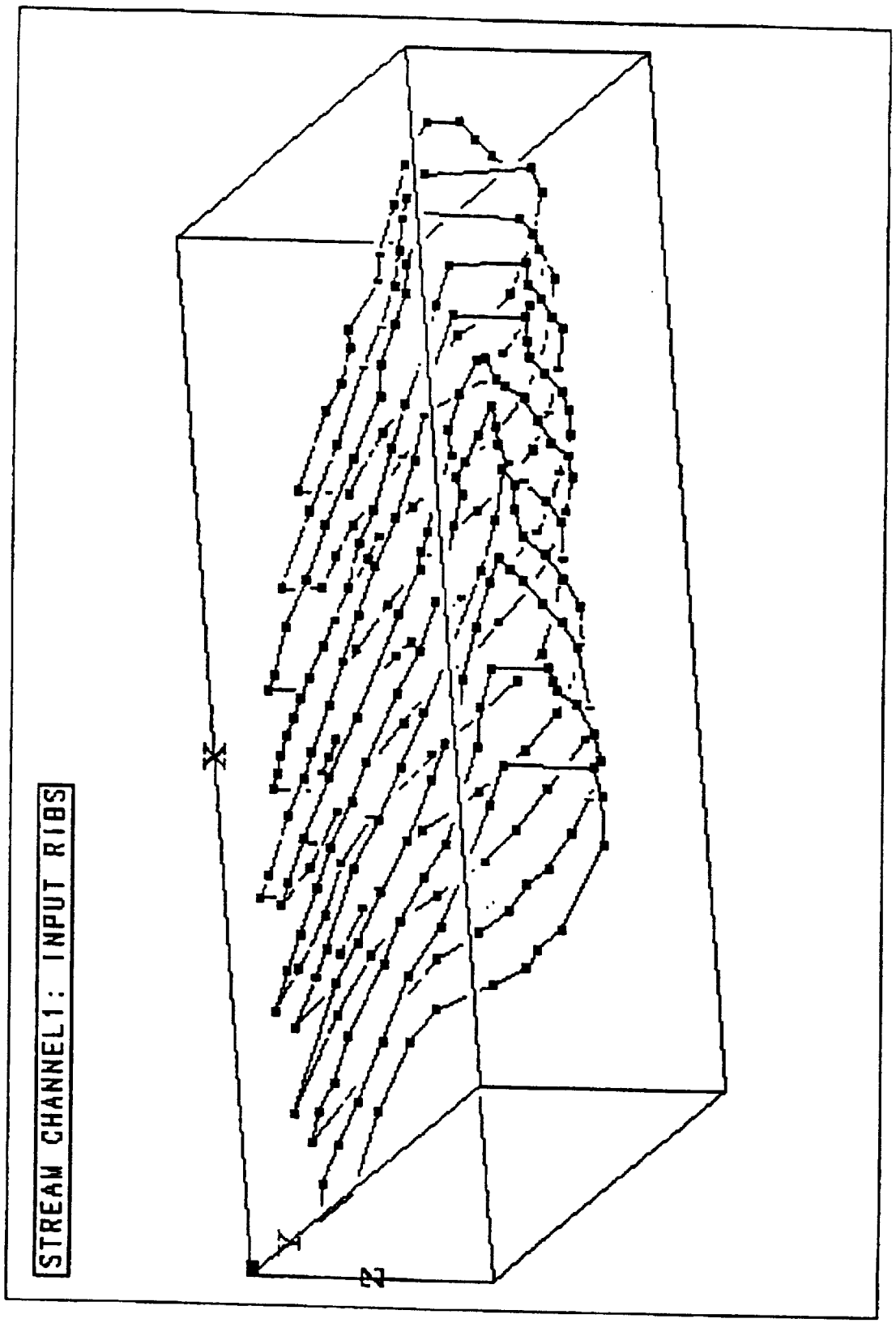
FIG. 10 Shows stream channel ribs from vertical sections.

A stream channel was examined on a series of vertical seismic sections chosen to be more or less normal to the direction of the channel. One each section a polygon was drawn. This series of ribs is shown in FIG. 10.

Processing

Figure 11:
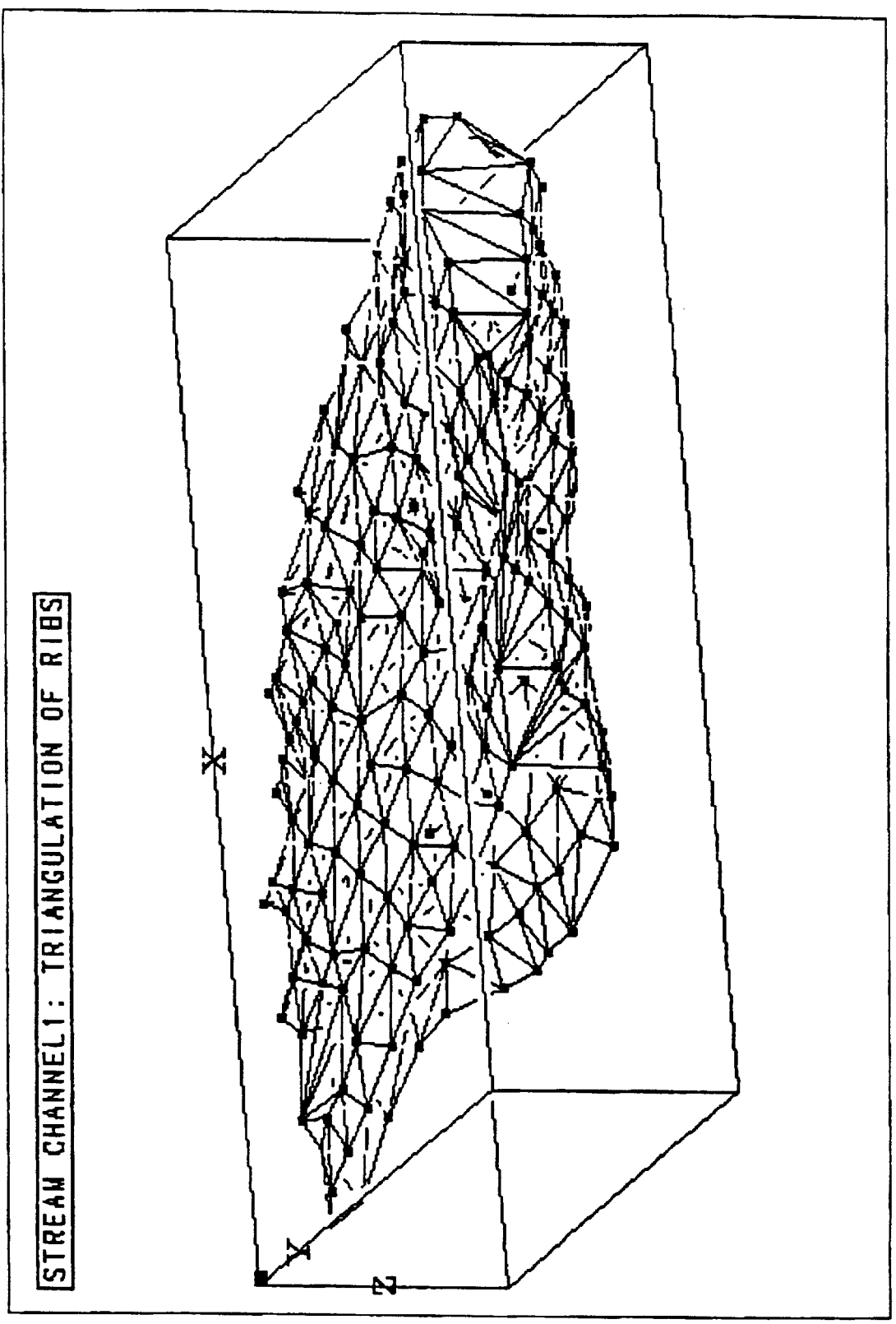
FIG. 11 Shows triangulation of stream channel ribs.
Figure 12:
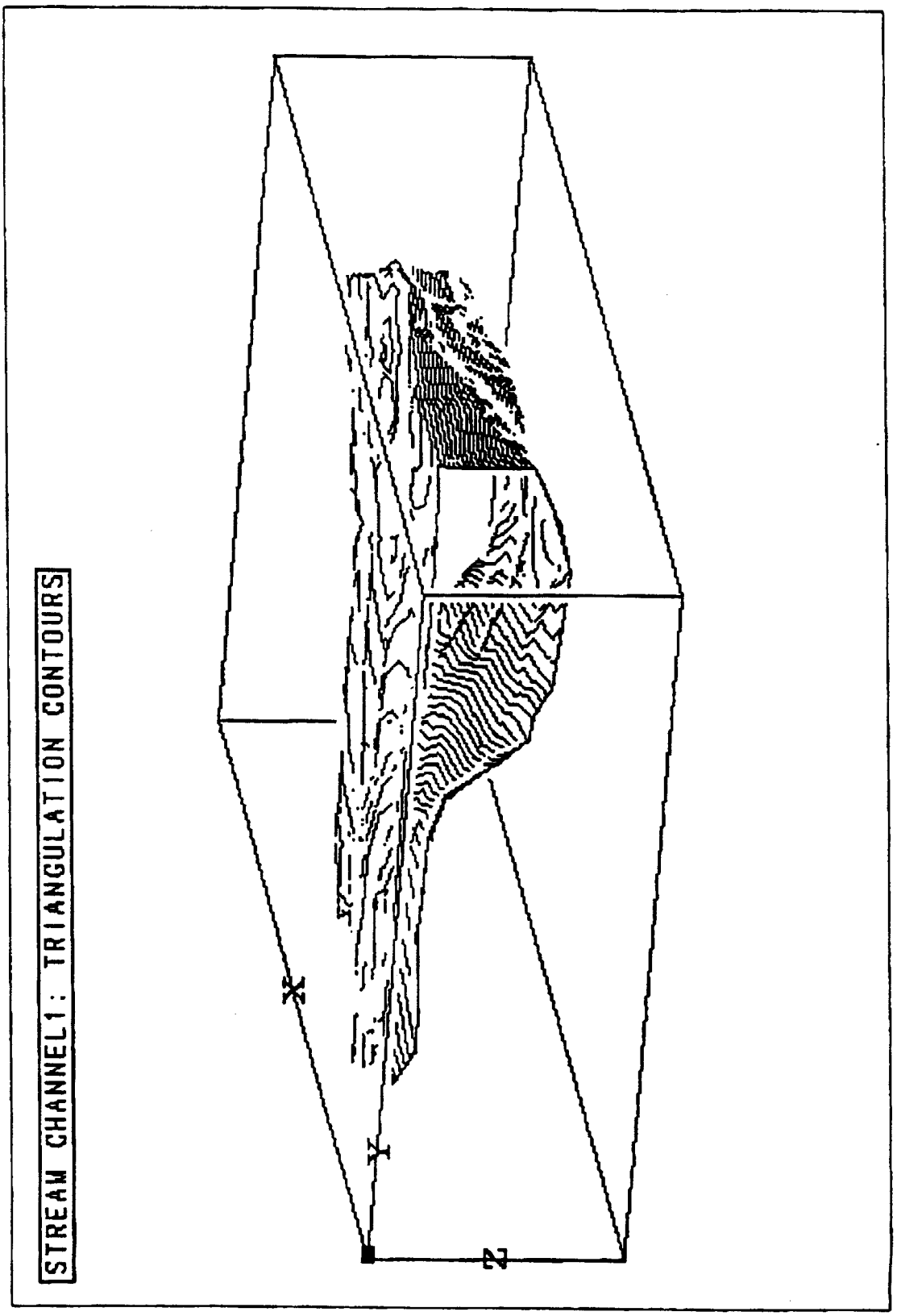
FIG. 12 Shows contouring of stream channel triangulation.

Although the ribs do not have constant x or constant y coordinates, RibFill determined that each rib lay in a vertical plane and that all of these planes were (to a tolerance) parallel to each other. In this case RibFill chooses as a sequencing parameter the normal distance from the origin to the plane. The issues of node order were resolved by a polygon area sign test similar to that described in Section 2.3 except that the polygons'nodes are first projected onto coordinates of a common plane. The triangulation is shown in FIG. 11, and a contouring in FIG. 12. For the latter figure, the view is rotated so that a view is presented down the tunnel of the stream.

Comments

In the tracking of this stream there was no need to change the sectioning plane to preserve approximate normality to the stream center line. RibFill's code allows such change. The artificial example in the next section was designed to test that functionality.

2.5 Halo

Ribs

Figure 13:
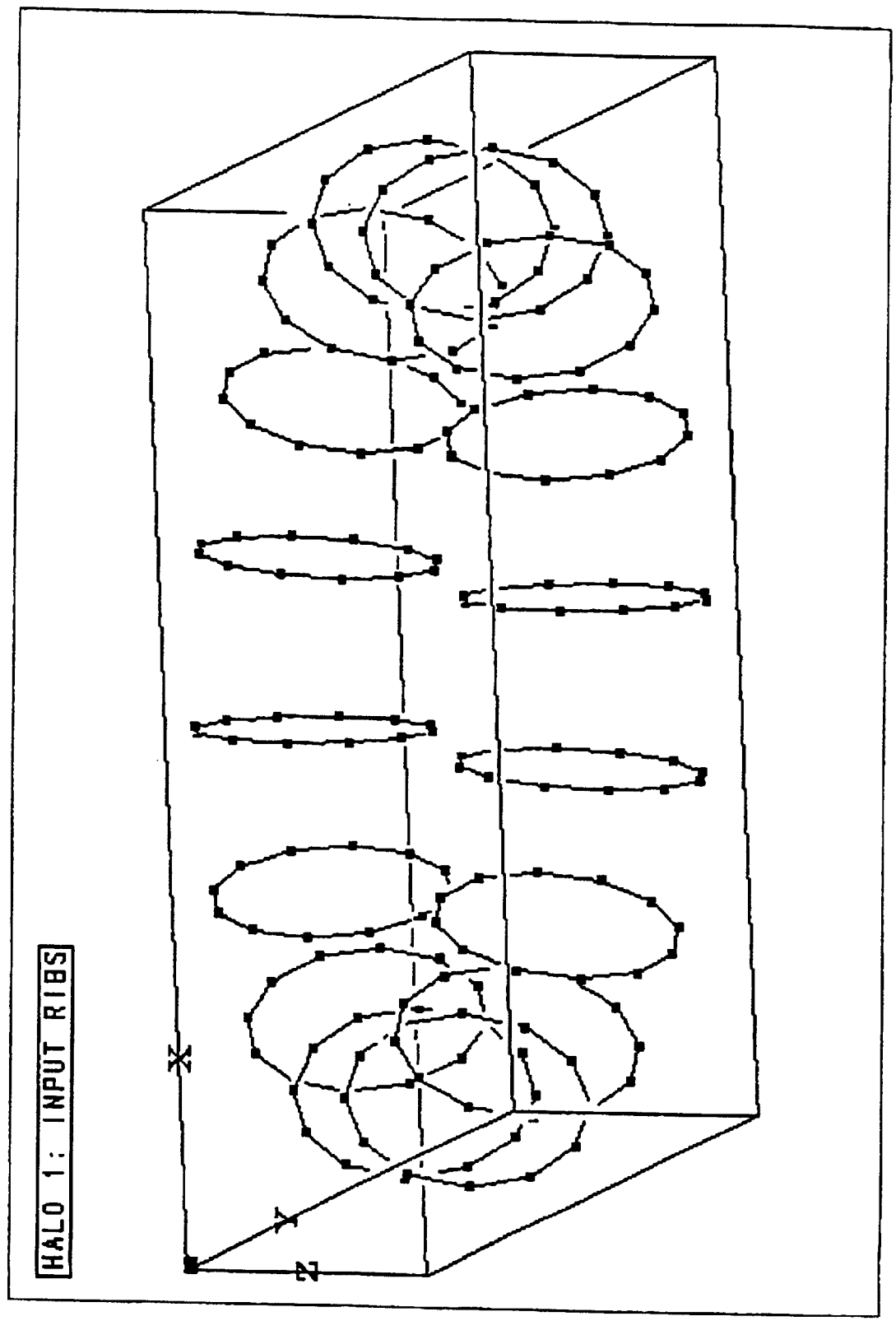
FIG. 13 Shows ribs from synthetic halo.

There is an interest in capturing the surface of an artificial torus, a shape for modeling a severely turning stream or perhaps some halo shape of geologic interest. The ribs, generated by a simple program as vertical section circles with centers disposed around a horizontal circle, are shown in FIG. 13.

Processing

As in the case of the stream channel of Section 2.4, RibFill begins by discovering that each rib lay on a vertical section, but found that here the sections are not parallel. In such cases RibFill seeks a rib ordering principle based on the centroids of the ribs. These centroids are a set of points in 3D space. For each centroid point a primary neighbor is determined to be that other centroid point which is closest. A plane through the given centroid and perpendicular to the line joining it to its primary neighbor divides space into two halfspaces. RibFill searches the halfspace not containing the primary neighbor for a nearest secondary neighbor, if there are any at all. RibFill then attempts to find a threading through this collection of primary and secondary neighbors which involves all of the centroids. In the case at hand, it not only established a unique sequencing for the ribs but also revealed the cyclic nature of the shape since every rib had both a primary and secondary neighbor.

The ribs were discovered also to be polygons, so the question of relative node ordering between neighboring ribs arises. For each pair of ribs the program first erects a u,v coordinate system on a plane perpendicular to the line joining the corresponding centroids. Then it projects each of the 3D polygons into this 2D system and computes signed areas in u,v coordinates. Comparison of area signatures again determines whether or not node reversal is needed.

Figure 14:
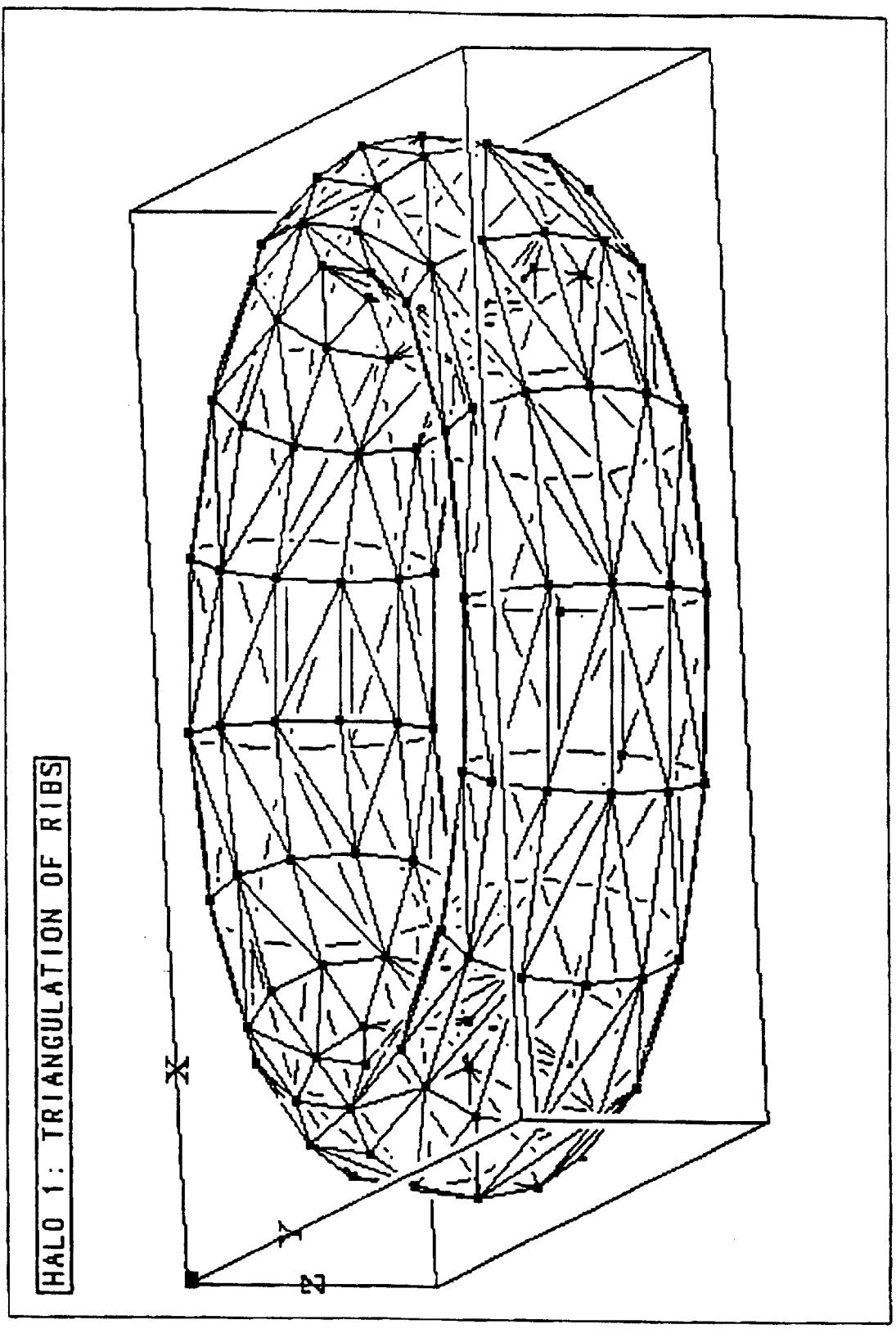
FIG. 14 Shows triangulation of synthetic halo ribs.
Figure 15:
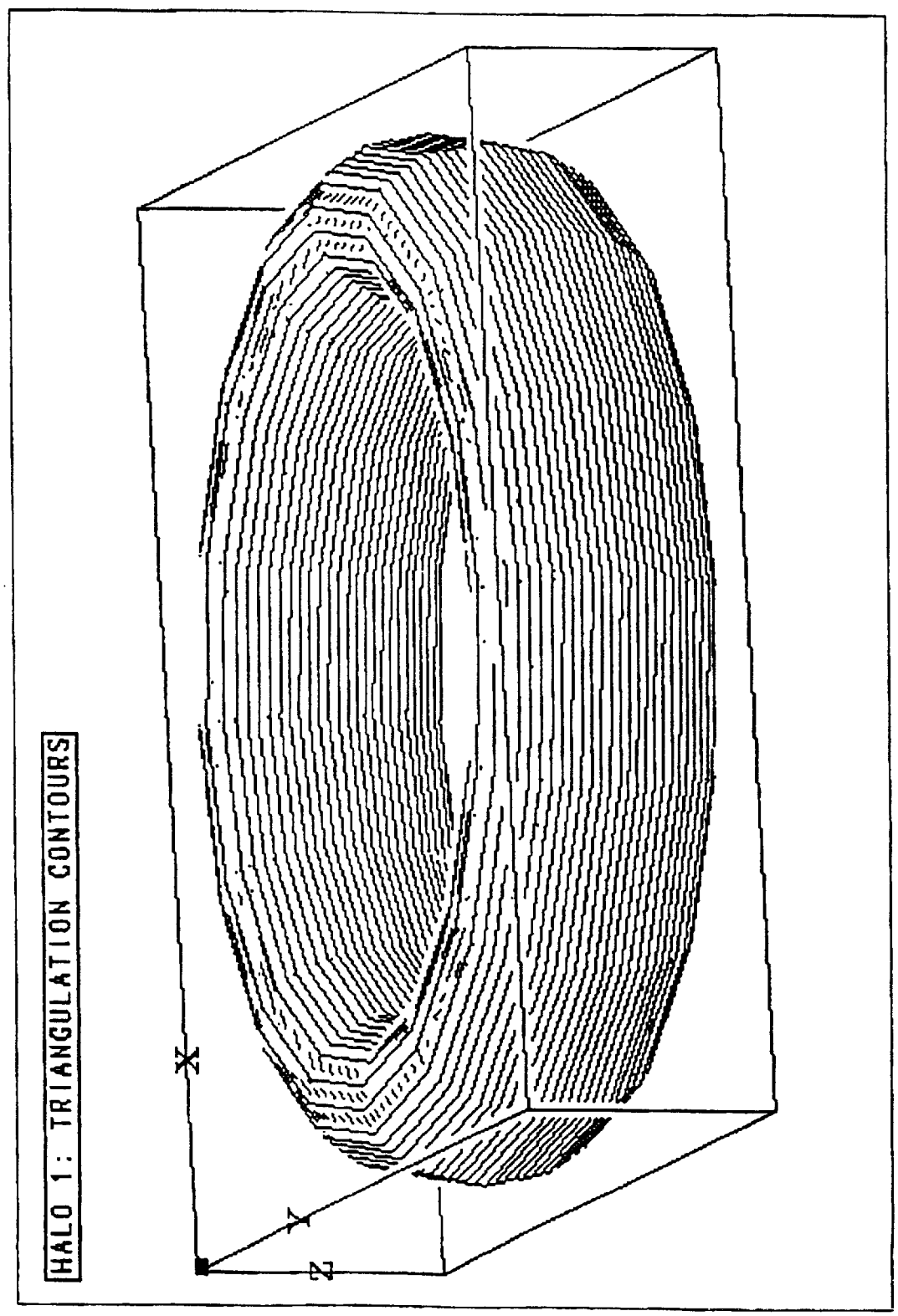
FIG. 15 Shows contouring of synthetic halo triangulation.

The triangulation and contouring are shown respectively in FIGS. 14 and 15.

Comments

An artificial example like this one is relatively simple to generate and very useful for exercising the program that might not occur with real data examples.

2.6 Moebius Strip

Ribs

Figure 16:
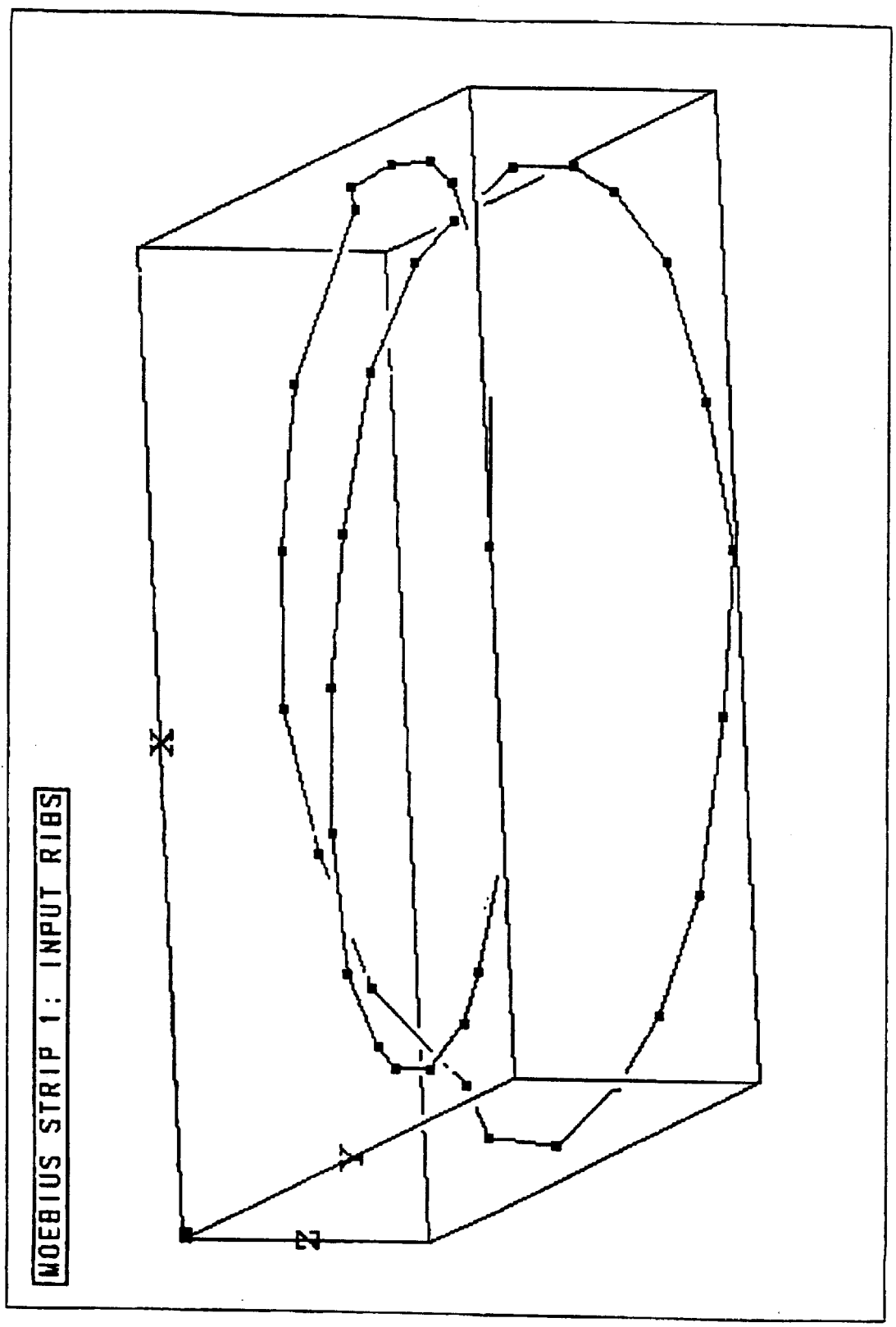
FIG. 16 Shows the two ribs of a Moebius strip.

Another artificial surface of some interest is the non-orientable Moebius strip surface. The strip has two ribs. One rib consists of one cycle of a right-handed spiral. The other rib is one cycle of a left-handed spiral. The two ribs join end-to-end as shown in FIG. 16.

Processing

Figure 17:
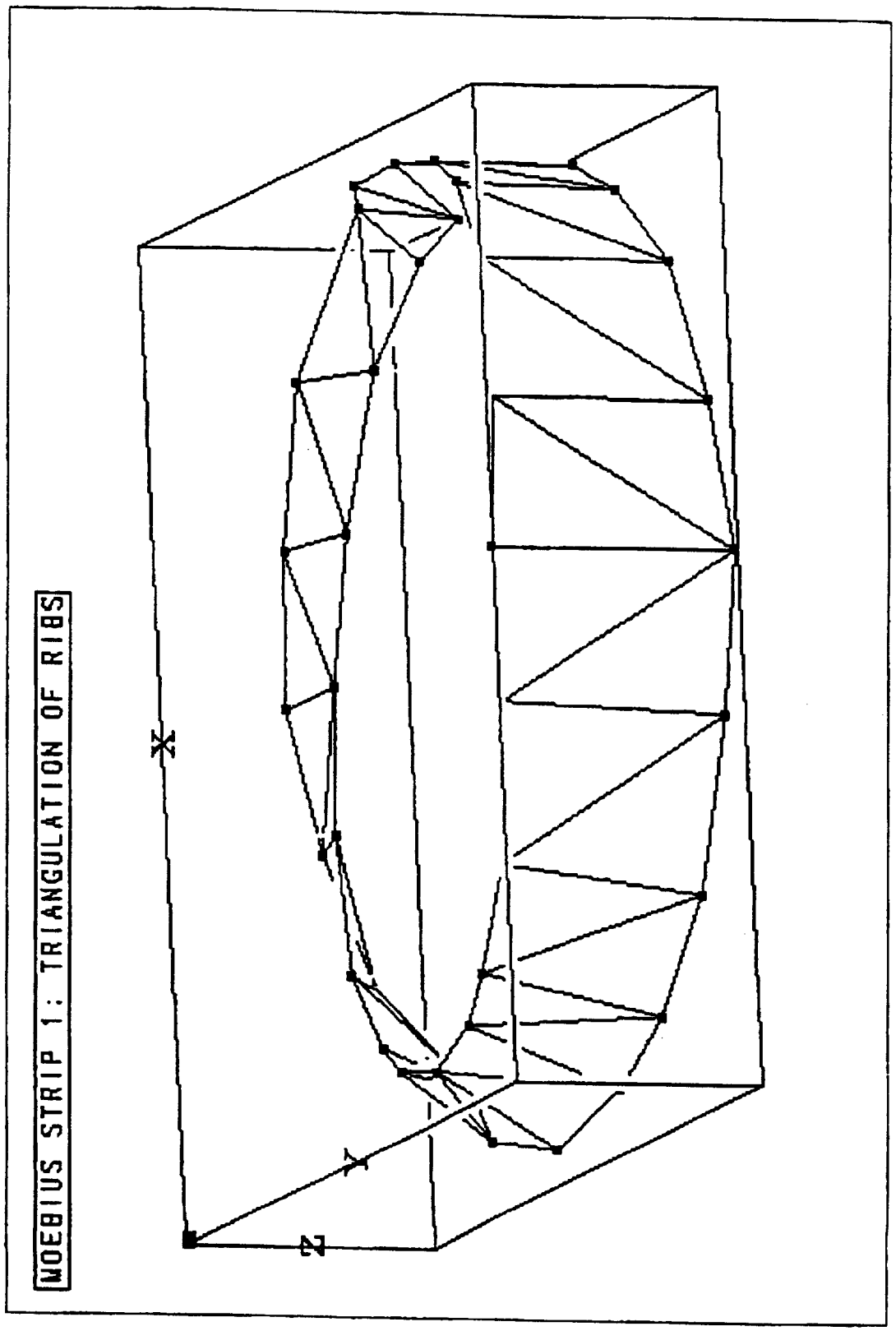
FIG. 17 Shows triangulation of Moebius strip ribs.
Figure 18:
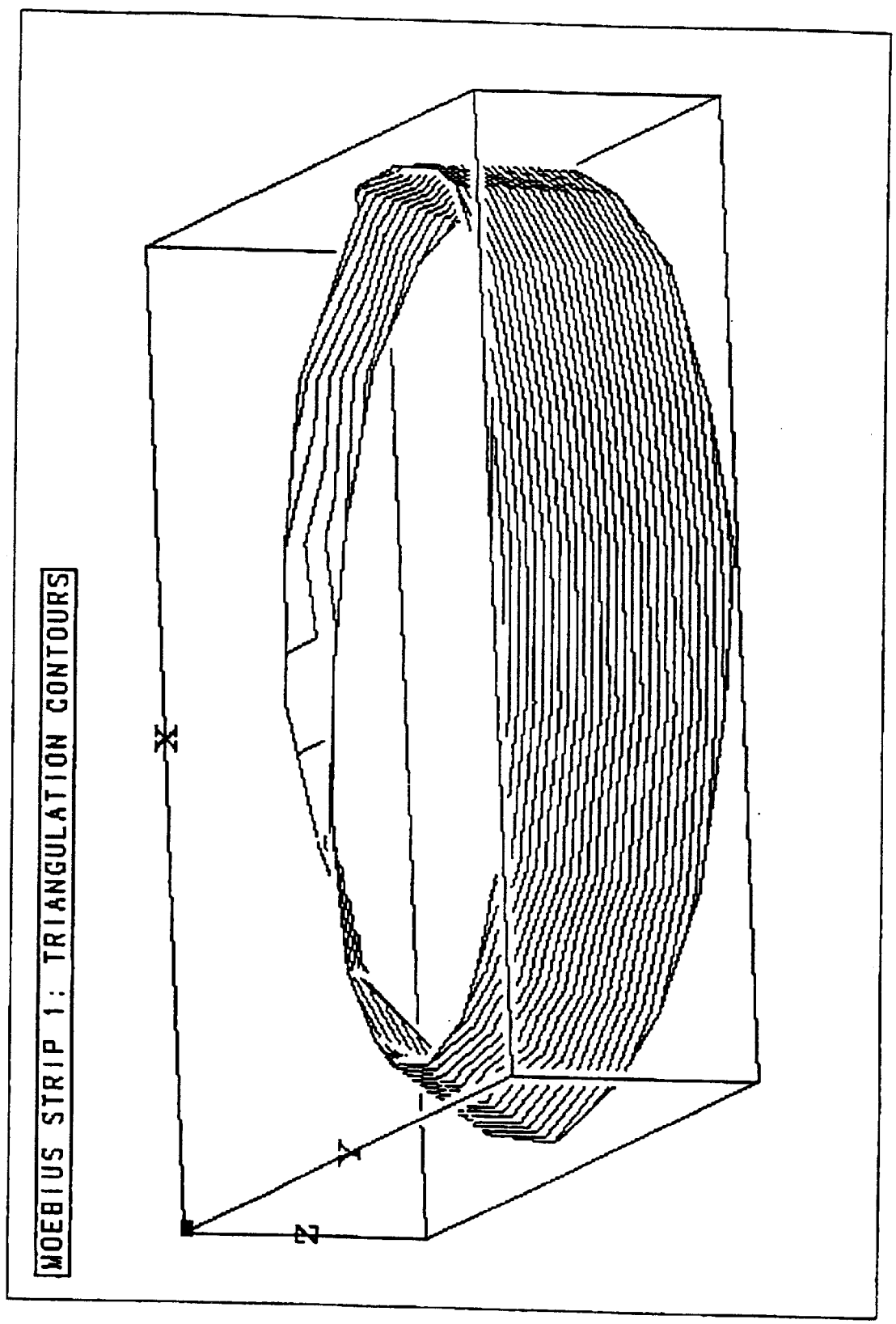
FIG. 18 Shows contouring of Moebius strip triangulation.

With only two ribs the question of rib sequencing does not arise, but the issue of node ordering does. The ordering issue is resolved in this case by performing the ladder triangulation with both orderings and choosing that ordering with least total -rung length. FIGS. 17 and 18 show the triangulation and contouring.

Not Quite Moebius

Figure 19:
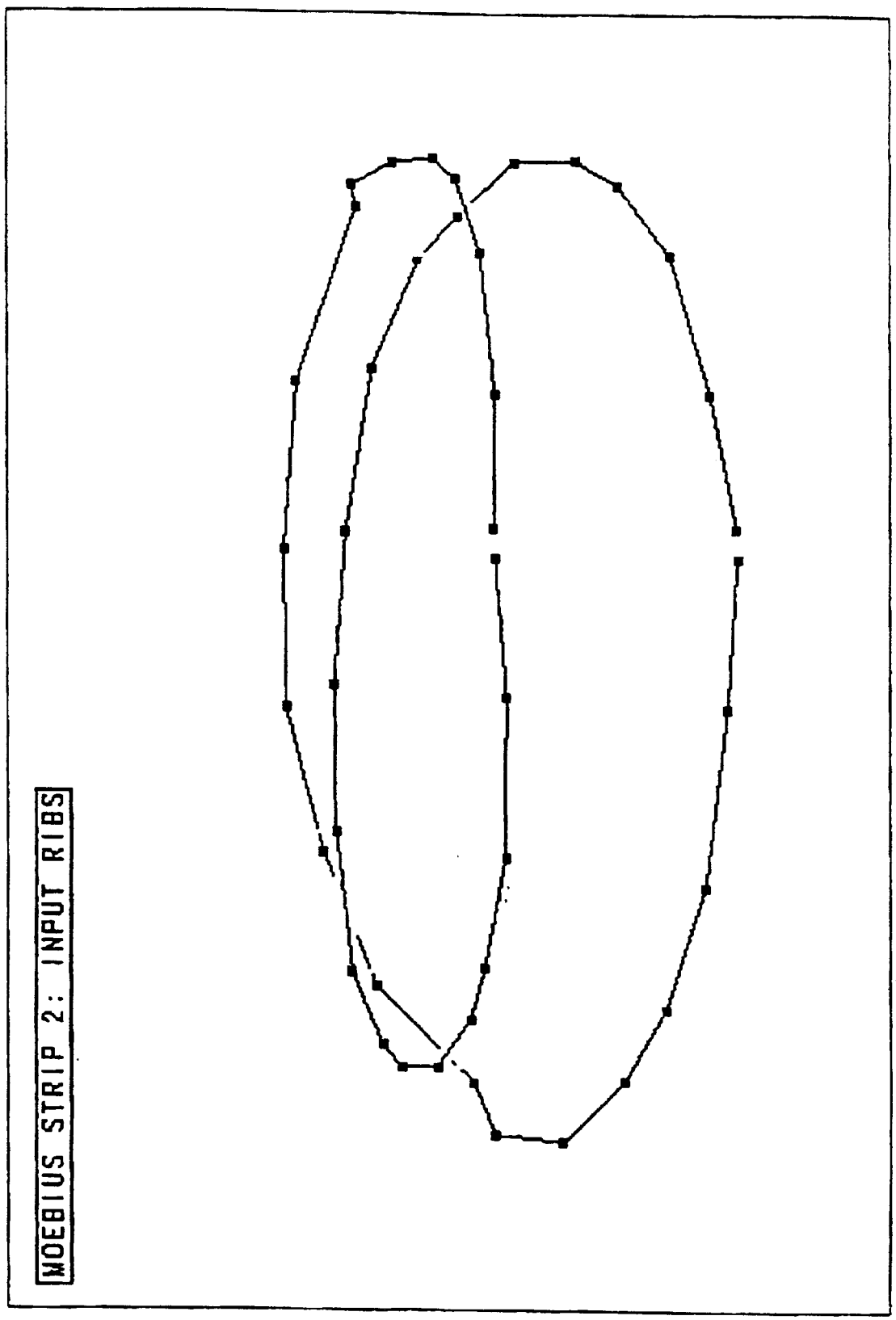
FIG. 19 Shows two ribs of an almost-Moebius strip.
Figure 20:
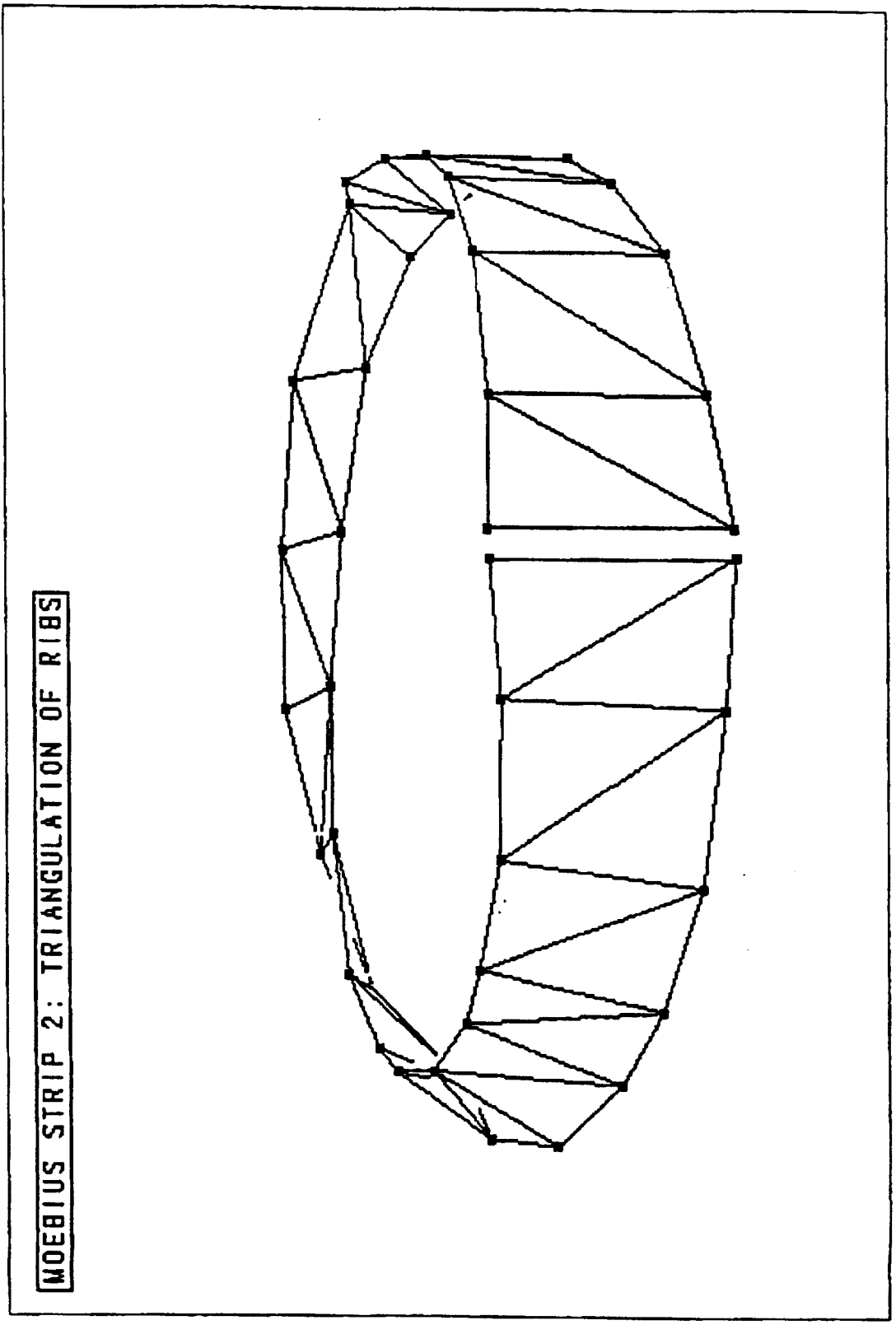
FIG. 20 Shows triangulation of almost-Moebius strip ribs.
Figure 21:
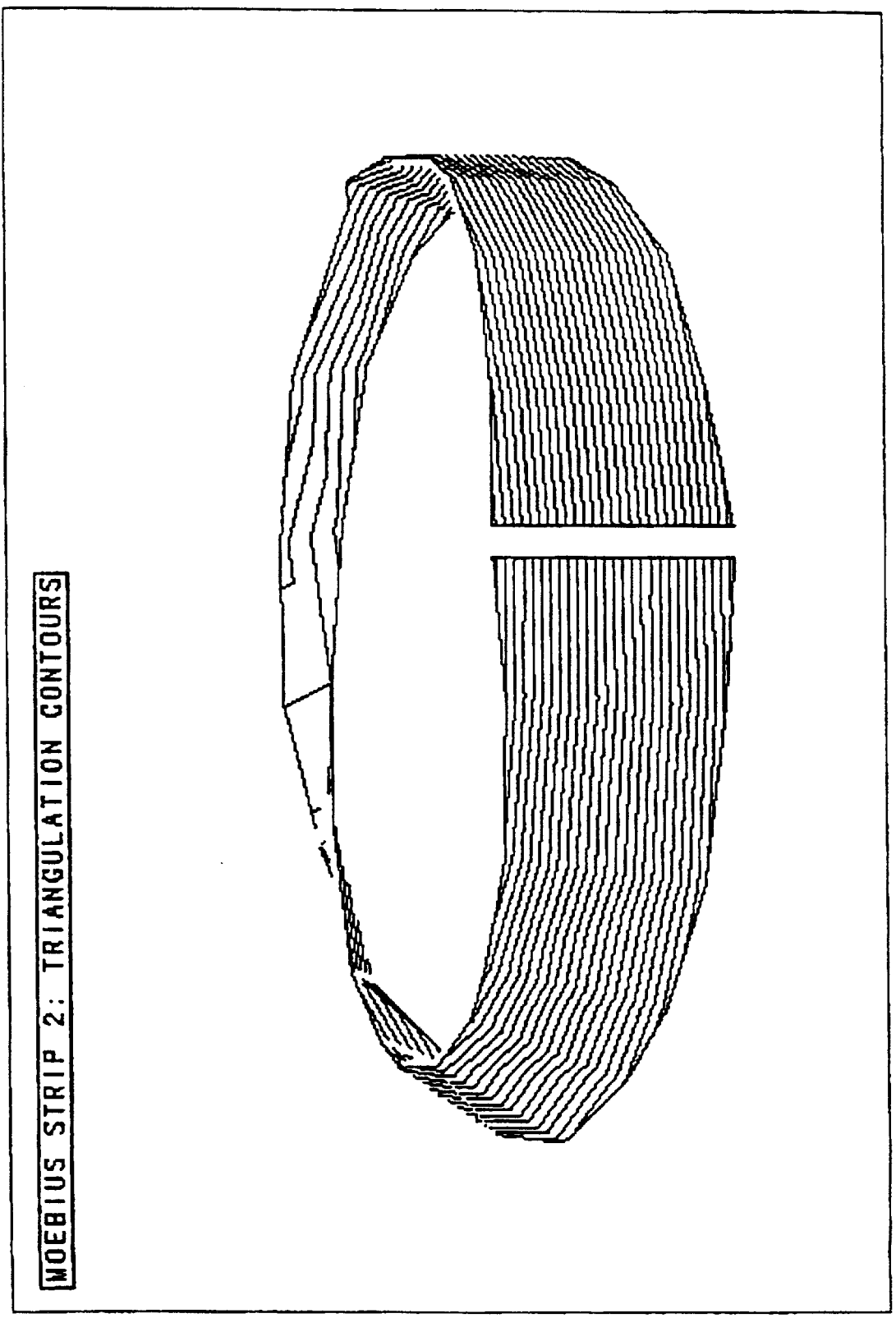
FIG. 21 Shows contouring of almost-Moebius strip triangulation.

The figures given for the Moebius strip are not easy to follow. Therefore this example has been recomputed with a strip where the two ends of the strip axe not quite joined together. FIGS. 19, 20 and 21 giving the ribs, triangulation and contouring of the not-quite Moebius strip, and removing the coordinate box, are somewhat easier to interpret.

Comments

The fact that the rib approach has no problem with this non-orientable surface is due to the incremental and coordinate-system-indendent attributes of the invention.

2.7 Klein Bottle

Ribs

Figure 22:
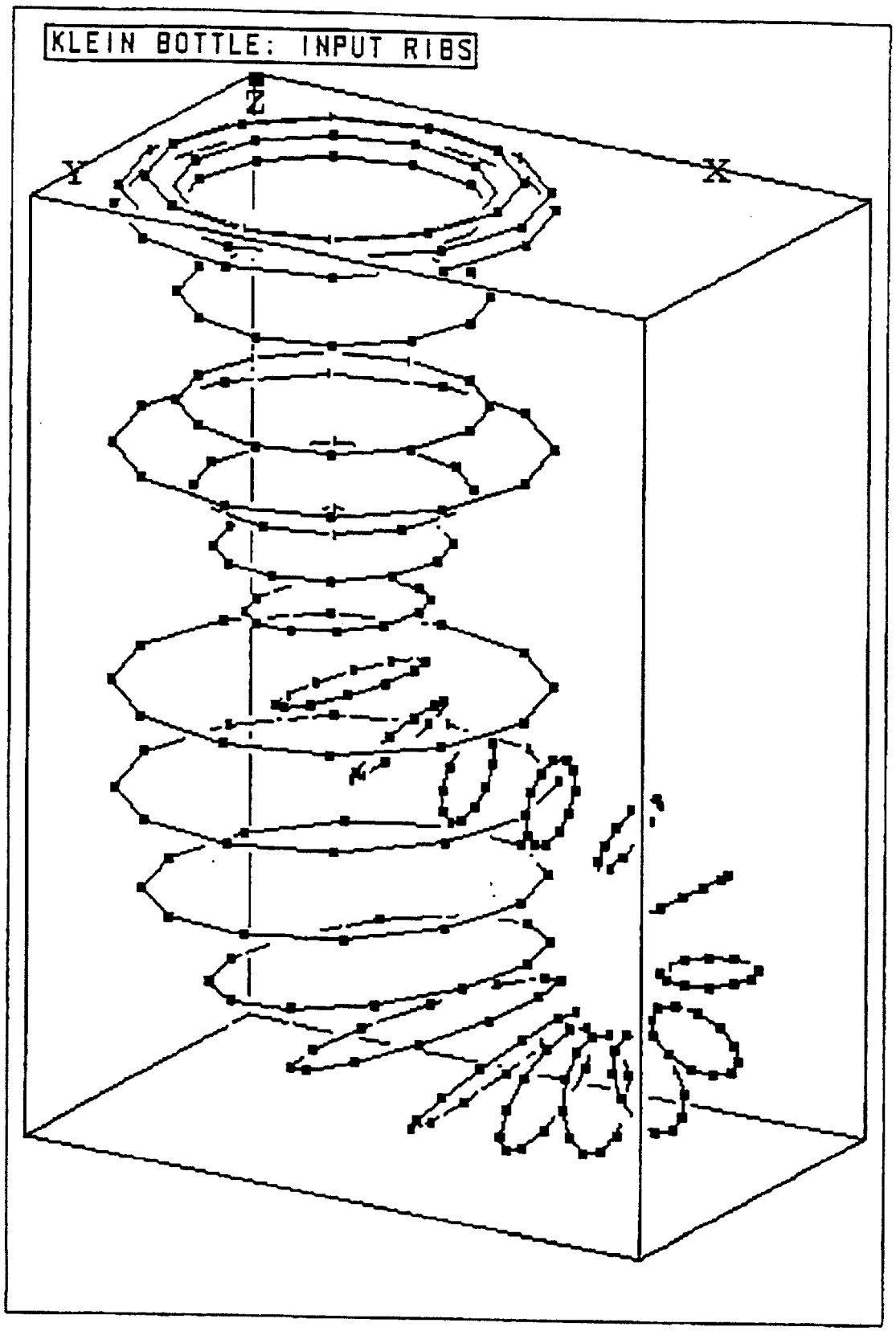
FIG. 22 Shows ribs for a Klein bottle.

While the Moebius strip is a surface of one side with only one edge, the Klein bottle is a surface of one side and no edges. It is not hard to conceive of ribs for the Klein bottle as 3D circles lying on planes normal to the curving axis of such a bottle. FIG. 22 presents a set of such ribs generated by the RibFill program.

Processing

Figure 23:
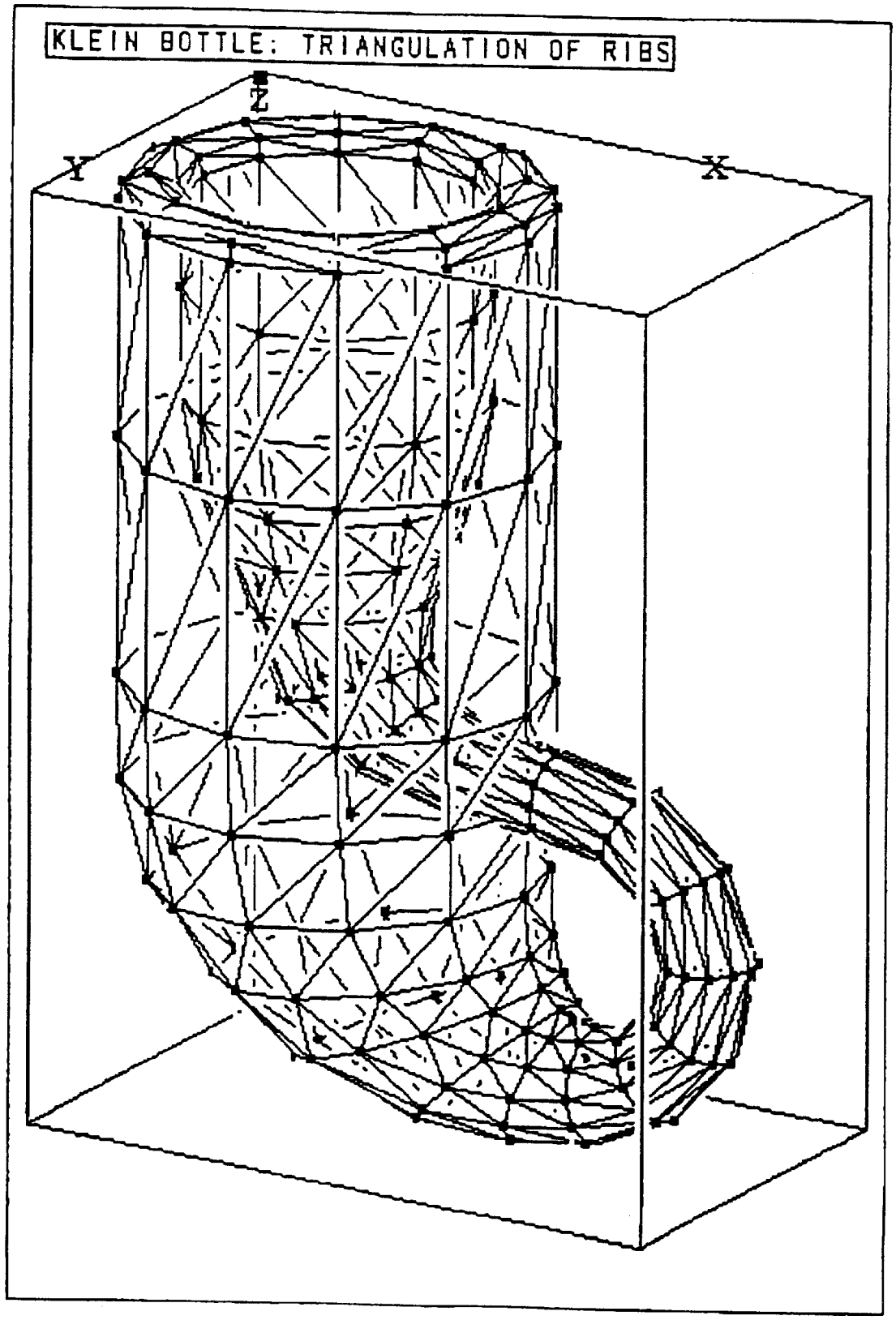
FIG. 23 Shows triangulation of Klein bottle ribs.
Figure 24:
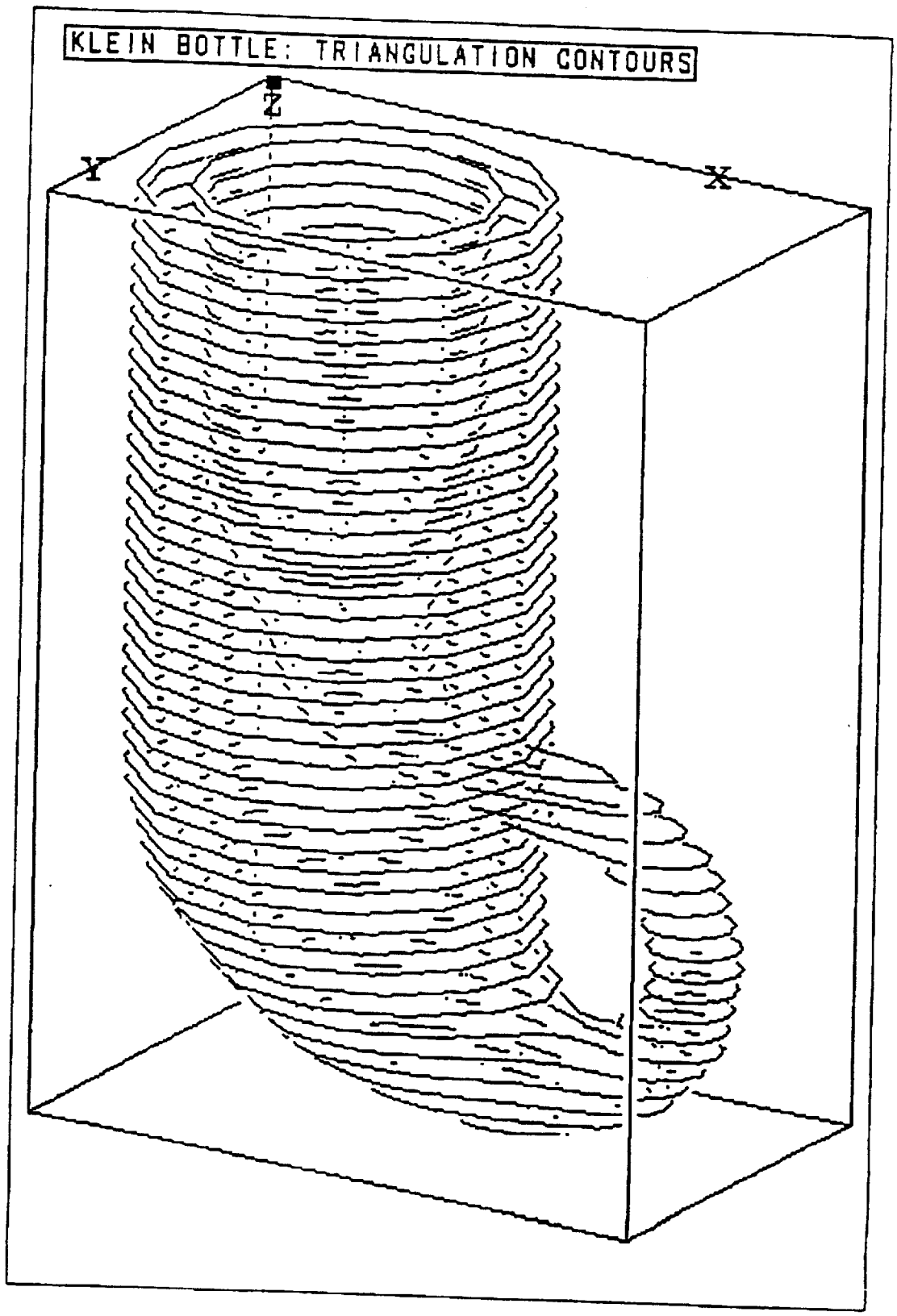
FIG. 24 Shows contouring of Klein bottle triangulation.

What is more difficult than generating Klein bottle ribs is inventing a scheme for the automatic sequencing of such ribs. An option is added to RibFill that forces it to take ribs in the sequence presented to it. Invoking that option leads readily to the triangulation and contouring of FIGS. 23 and 24.

Comments

There are no non-orientable surfaces of geologic interest, but the exercise of requiring RibFill to handle such an object has led to a functional option which is of use. Interactive graphical rib ordering is an additional desirable function.

2.8 Volcano

Ribs

Figure 25:
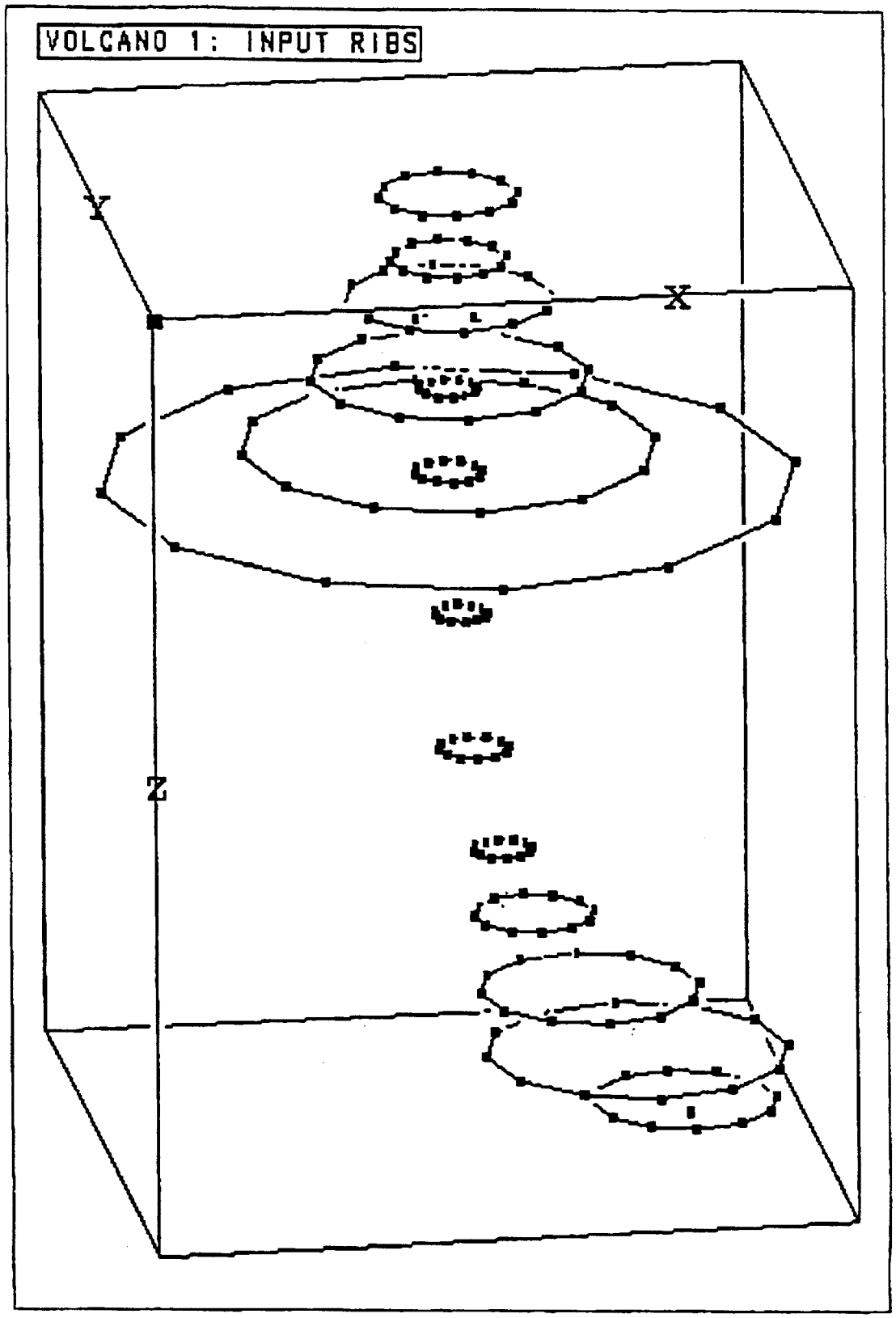
FIG. 25 Shows ribs for a volcano.

The upper half of a Klein bottle is suggestive of a vertical tunnel, which suggests the surface of a volcano as a candidate for rib triangulation. To illustrate this possibility a number of circular ribs are shown in FIG. 25.

Processing

Figure 26:
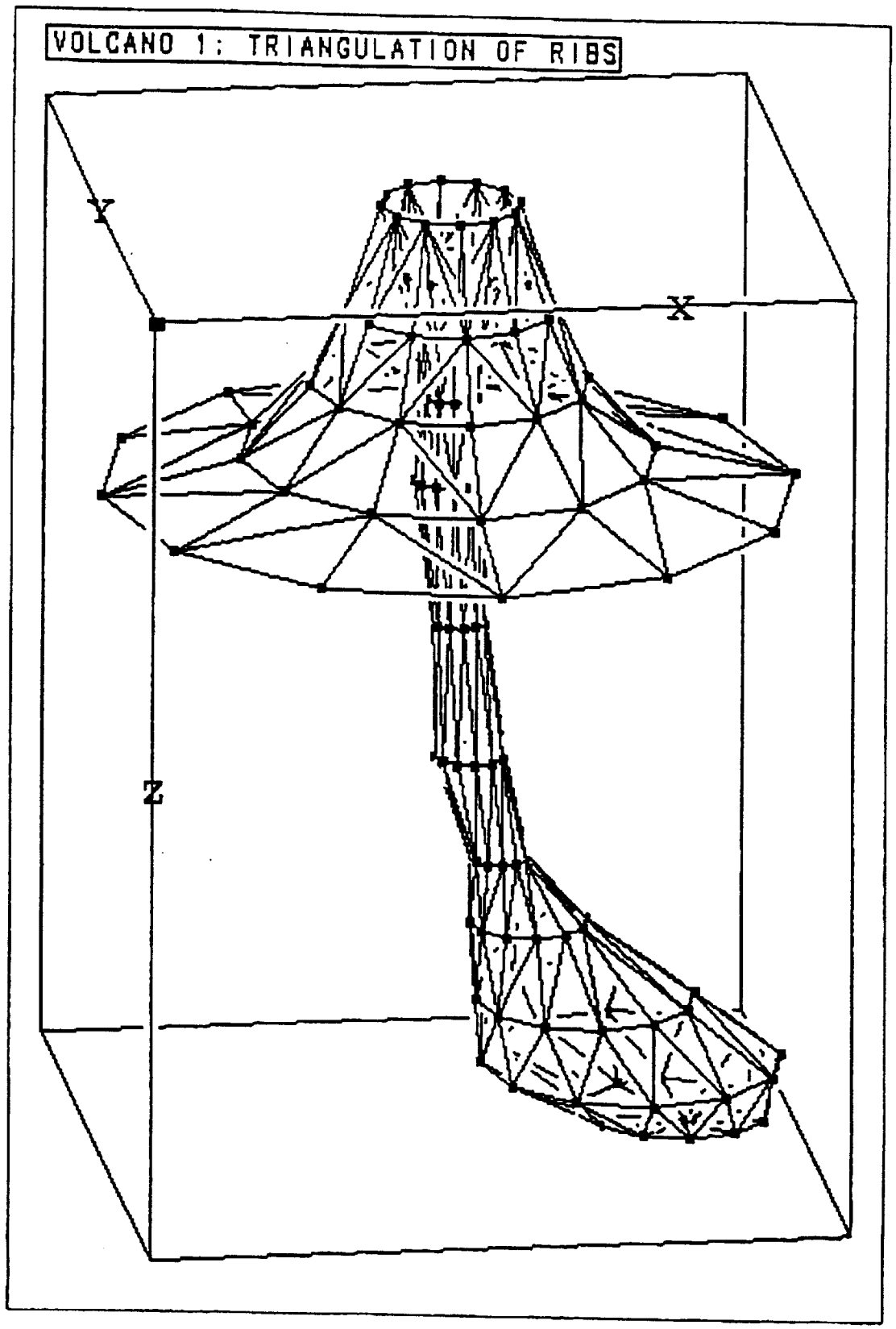
FIG. 26 Shows triangulation of volcanic ribs.
Figure 27:
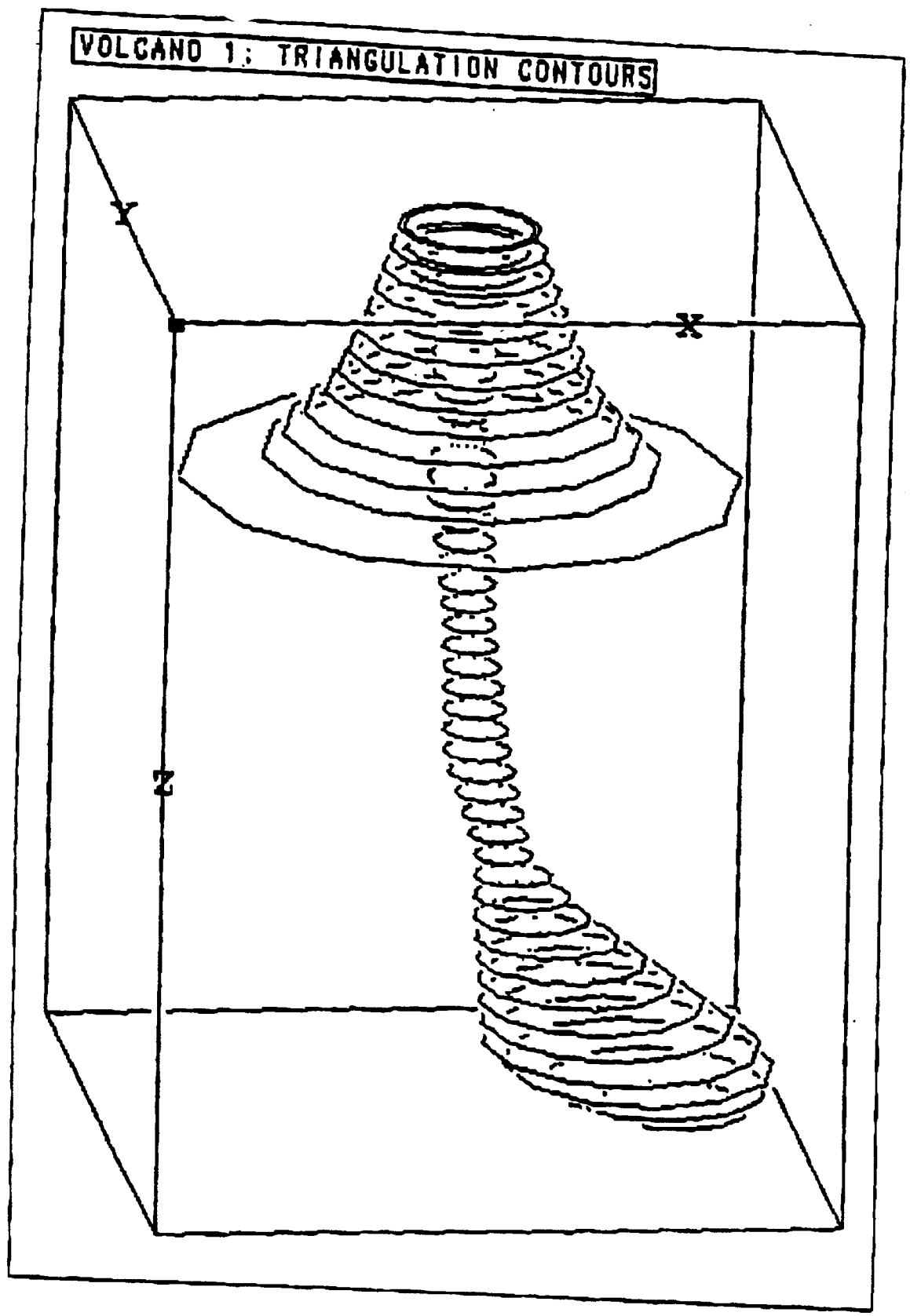
FIG. 27 Shows contouring of volcanic rib triangulation.

As in the Klein bottle case, the force-rib-sequencing option of RibFill is invoked. Doing so, FIGS. 26 and 27 illustrate the triangulation and contouring for the volcanic object. The magmatic chamber at the bottom is closed, because the last rib was intentionally degenerated to a point.

Comments

Circular ribs are presently shown which represent the earth's surface expanding in radius away from the volcano. Suppose these ribs gradually changed their shapes from circles to a square at a particular distance from the volcano. And suppose there existed an x,y gridded topography in which the volcano is imbedded. Then, the volcanic triangulation of this example could be attached to the gridded topography by a ladder triangulation of the square to a slightly larger square in the x,y grid. A truly impressive triangulated surface could be the result, especially if more volcanoes were added.

2.9 Fan Lens

Ribs

Figure 28:
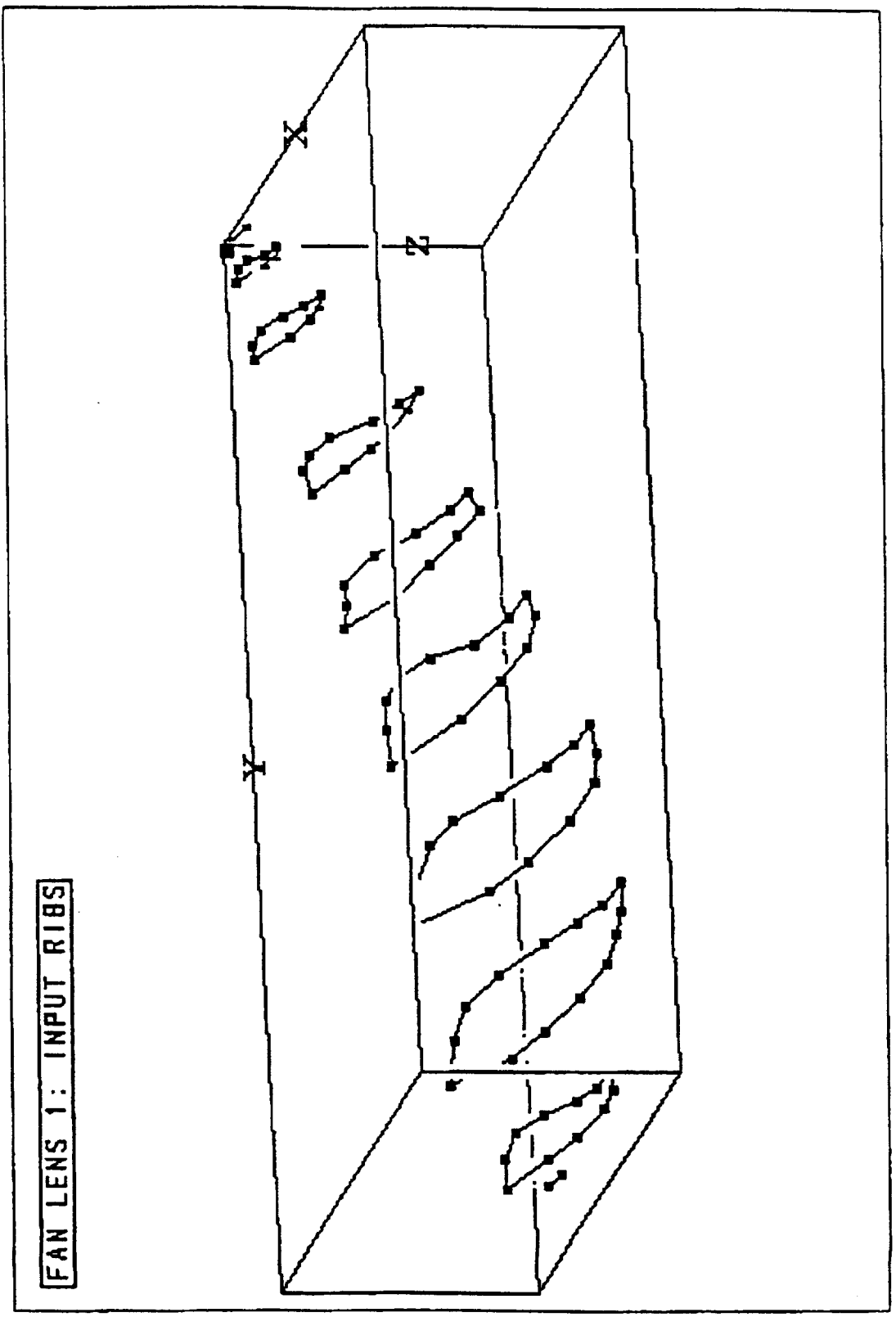
FIG. 28 Shows ribs of a synthetic fan lens.
Figure 29:
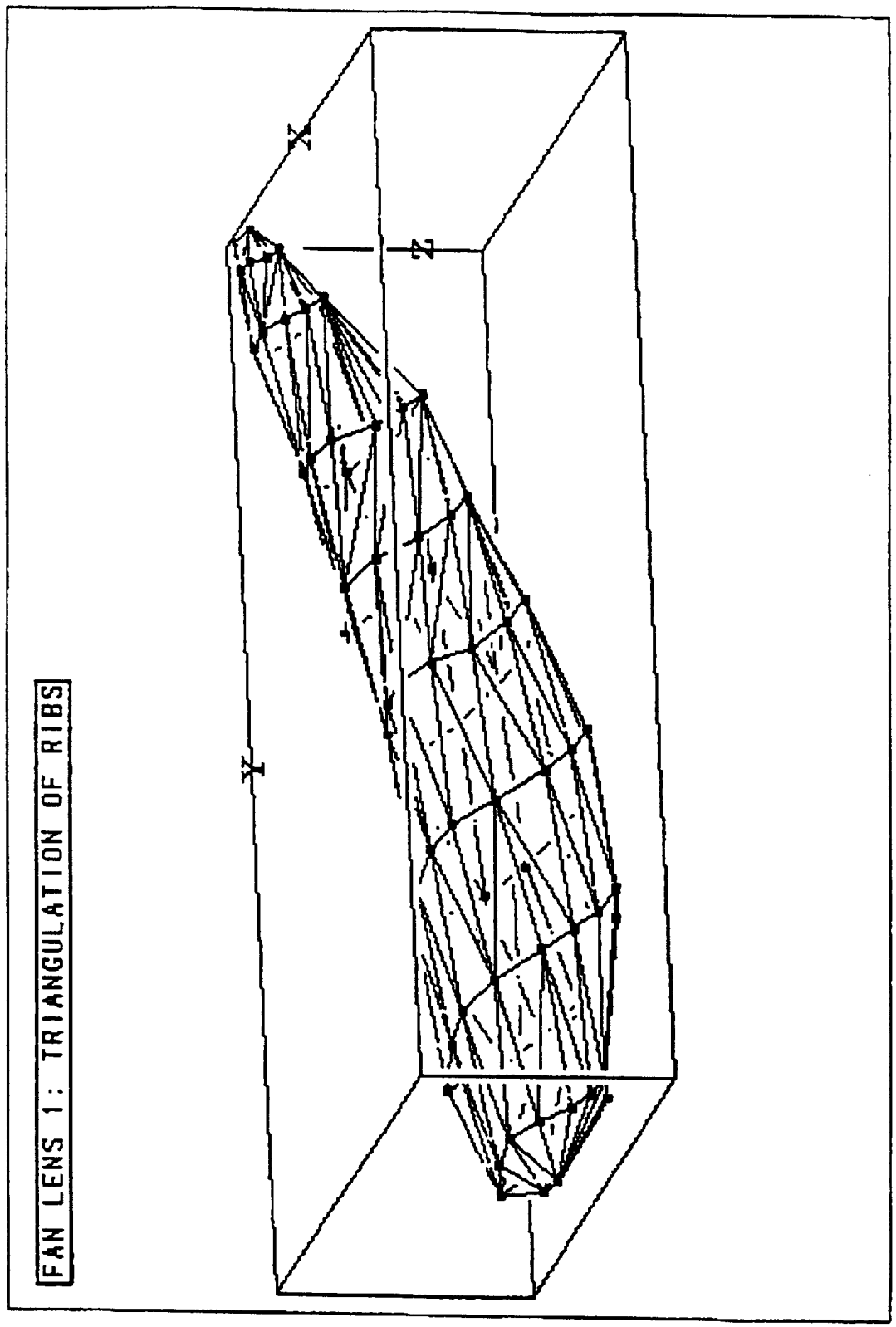
FIG. 29 Shows triangulation of fan lens ribs.
Figure 30:
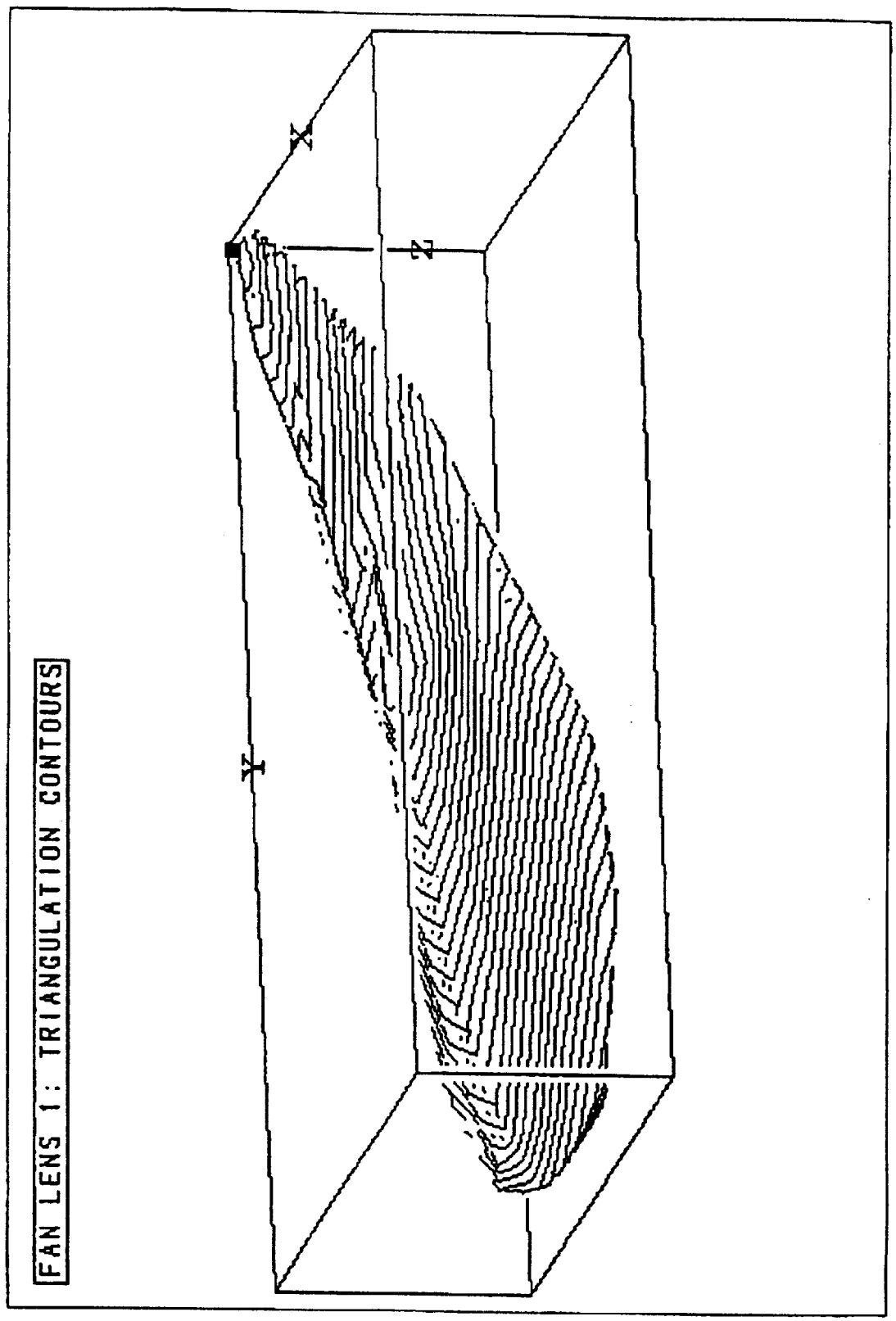
FIG. 30 Shows contouring of fan lens triangulation.

A number of vertical cross sections of what a typical lens might resemble were sketched. These cross sections, shown in FIG. 28, are closed polygons intended to serve as ribs for a surface construction.

Processing

The sequencing of these ribs follows that of vertically sectioned parallel ribs as described in Section 4. But the sharp comers at the rib edges presents a new challenge to the triangulation. Consider the polygons of two adjacent ribs. Say that the first rib polygon starts at point A on the left edge of the lens, runs over the top of the lens to point B at the right edge of the lens, turns abruptly and returns over the bottom of the lens to point A. Similarly say that the second rib polygon starts at point A' at the left, crosses over to point B' at the right, turns abruptly and returns to point A'. By the nature of ladder triangulation obtain a rung connecting A to A' will be obtained since that will be the first rung created (and the last rung created). But what about the desired connection of B to B"? Nothing so far assures that connectivity. In fact real data situations will almost always prevent that connection, resulting in a saw-tooth effect at the B edge of the lens.

To accommodate this situation, RibFill is equipped with an option requesting it to examine each input rib looking for comers where a comer is defined as a node at which the rib bend angle exceeds some assignable value. A list of such comers is kept for each rib. Processing proceeds only if every rib has the same number of comers. When this obtains, every ladder triangulation is broken into a succession of ladder triangulations of subnode lists, each subnode list starting and stopping at a comer point. This guarantees that every comer node on one rib will be runged to the corresponding comer node on the adjacent rib.

Comments

The fan lens here has only two comers, counting the starting node as a corner. To allow for more complex objects of geologic interest, the dimension limit on comers is set at a given number, e.g., five on a header file manifest.

2.10 Recumbent Fold

Ribs

Figure 31:
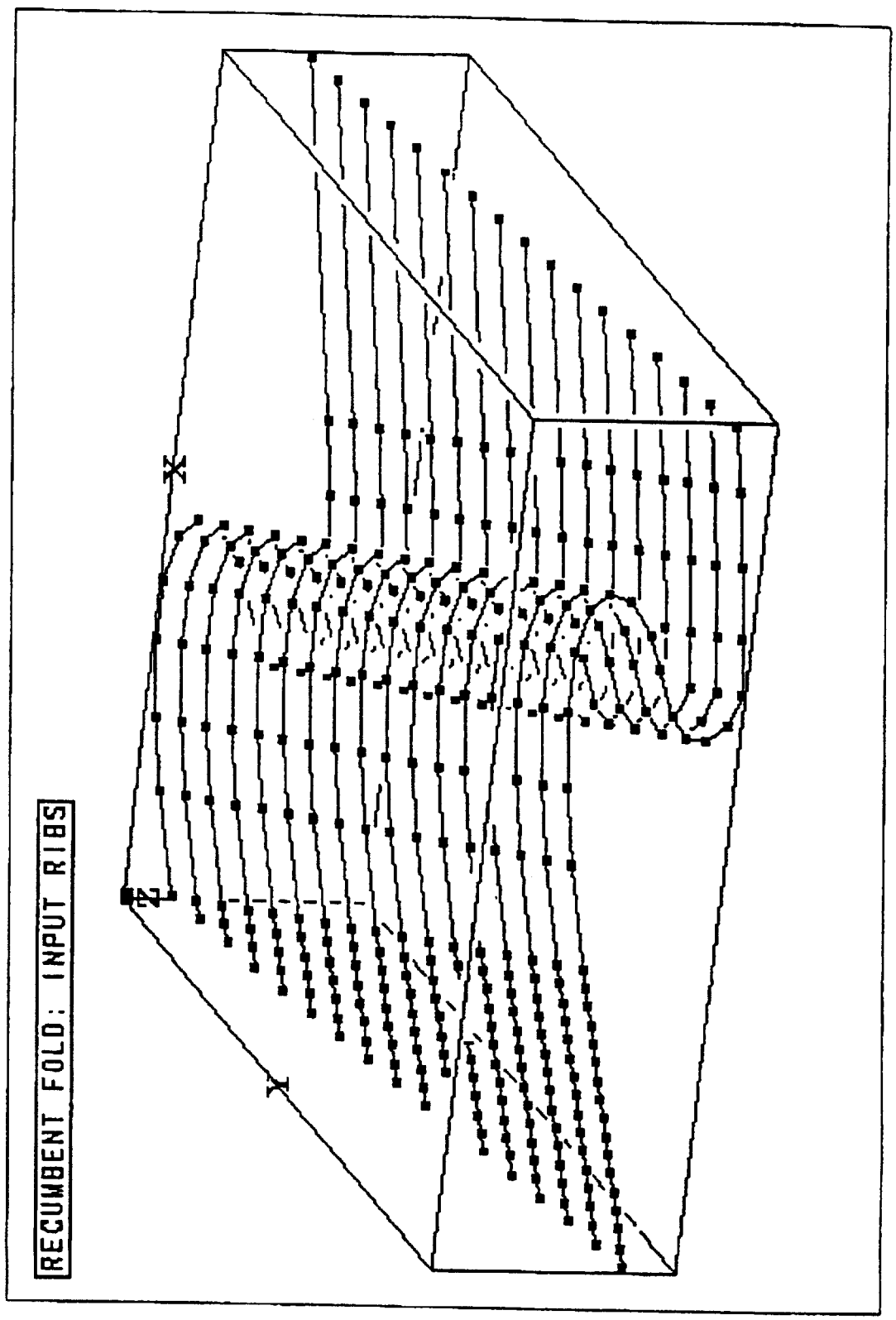
FIG. 31 Shows ribs for a synthetic recumbent fold.

If an interpreter can see a recumbent fold in vertical sections of seismic data, then he or she can draw the fold on a succession of such sections and RibFill will create the surface. Seventeen illustrative ribs are shown in FIG. 31.

Processing

Figure 32:
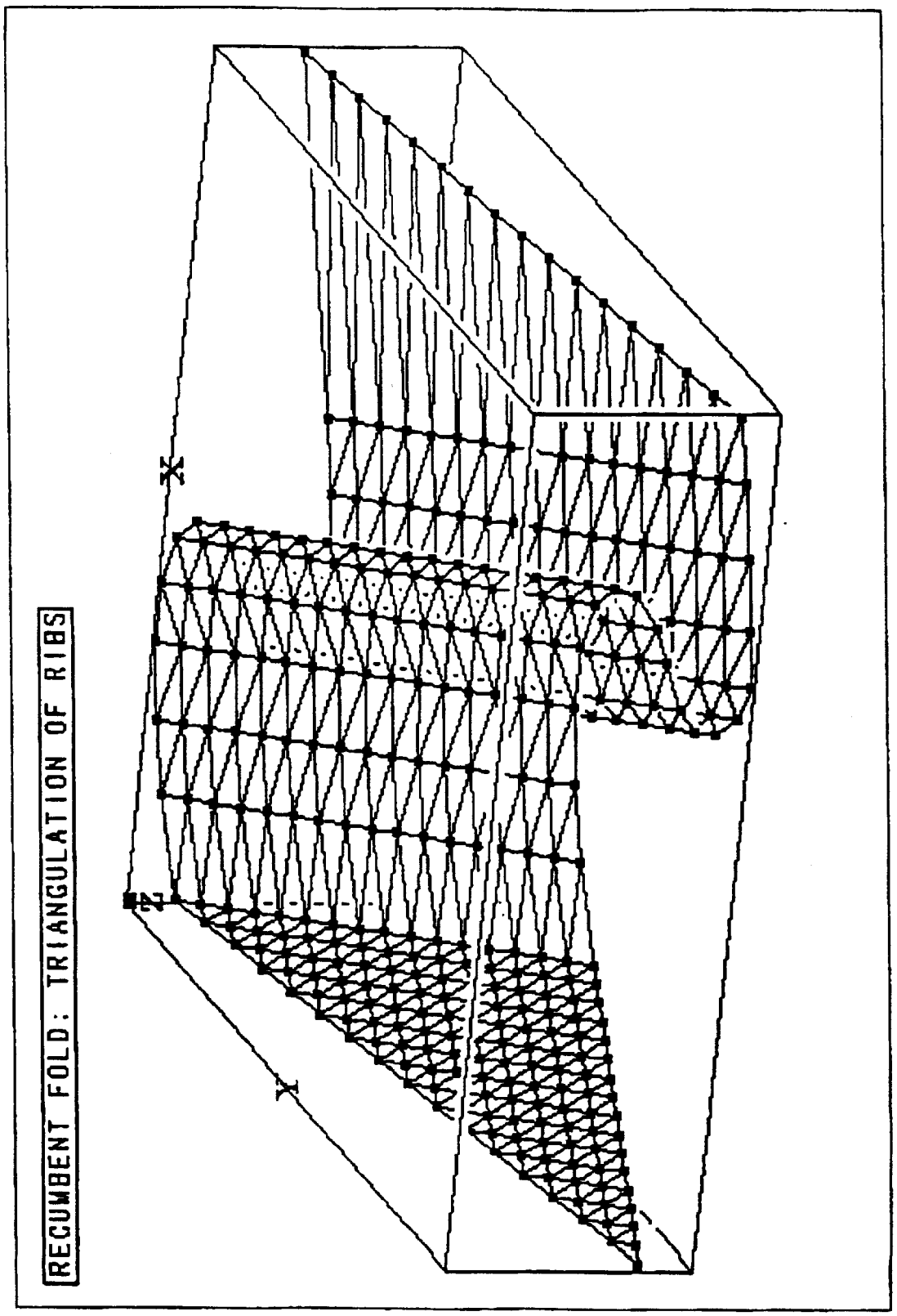
FIG. 32 Shows triangulation of recumbent fold ribs.
Figure 33:
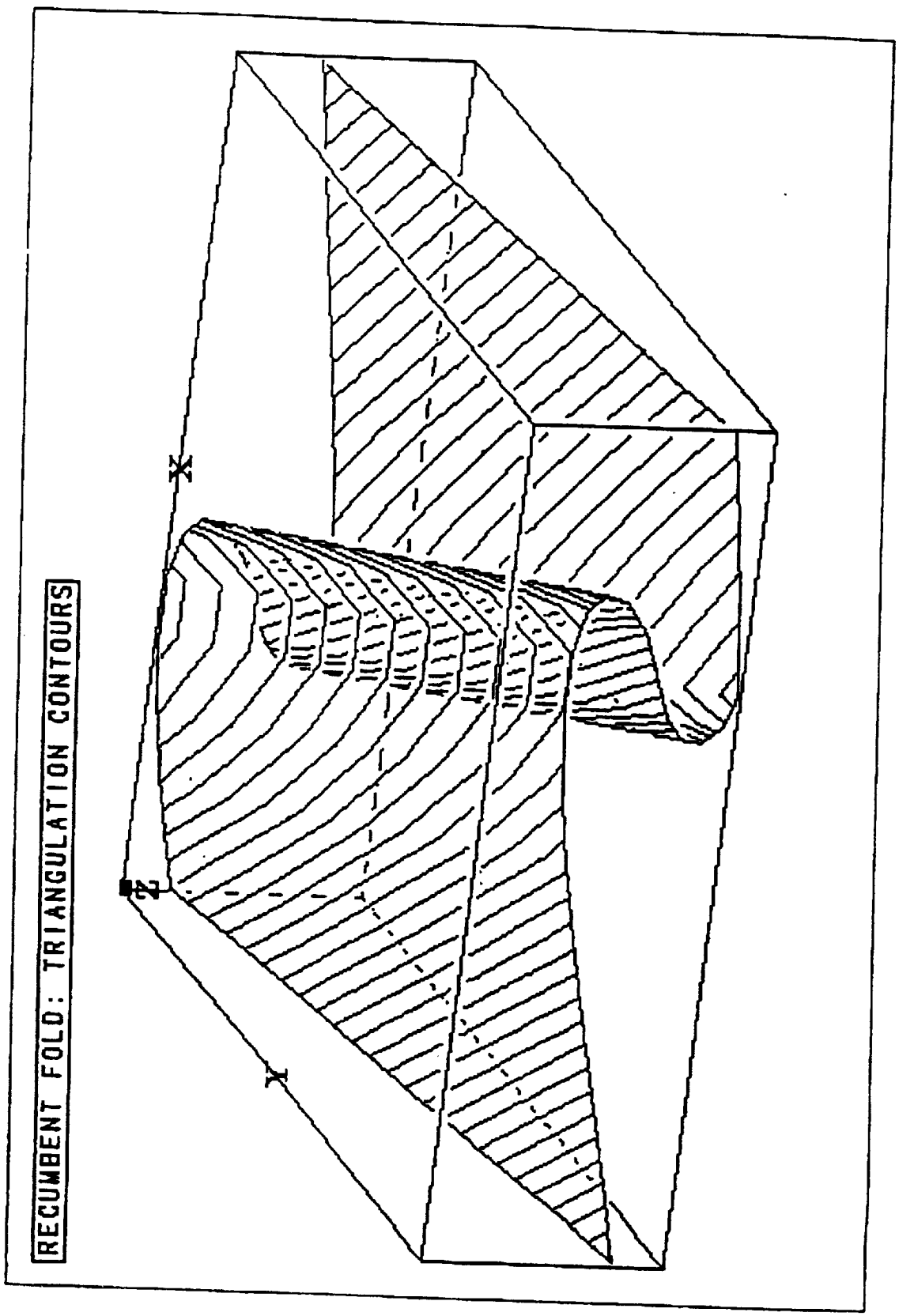
FIG. 33 Shows contouring of recumbent fold triangulation.

The processing is completely straightforward, following previous examples. It results in the triangulation of FIG. 32 (where the region of regular small triangles on the left of the fold is an artifact of rib generation), and the contouring of FIG. 33.

Comments

In a real folded horizon situation, for example as generated by Landmark's ZAP Program, a partial horizon surface on one side of the fold and another partial surface on the other side of the fold may have been generated. A single triangulation joining those two surfaces with a triangulation of the fold such as produced here may be desired. This is not difficult to do provided each rib is started and stopped at points common to the two partial surfaces.

2.11 Simple Fault

Ribs

Figure 34:
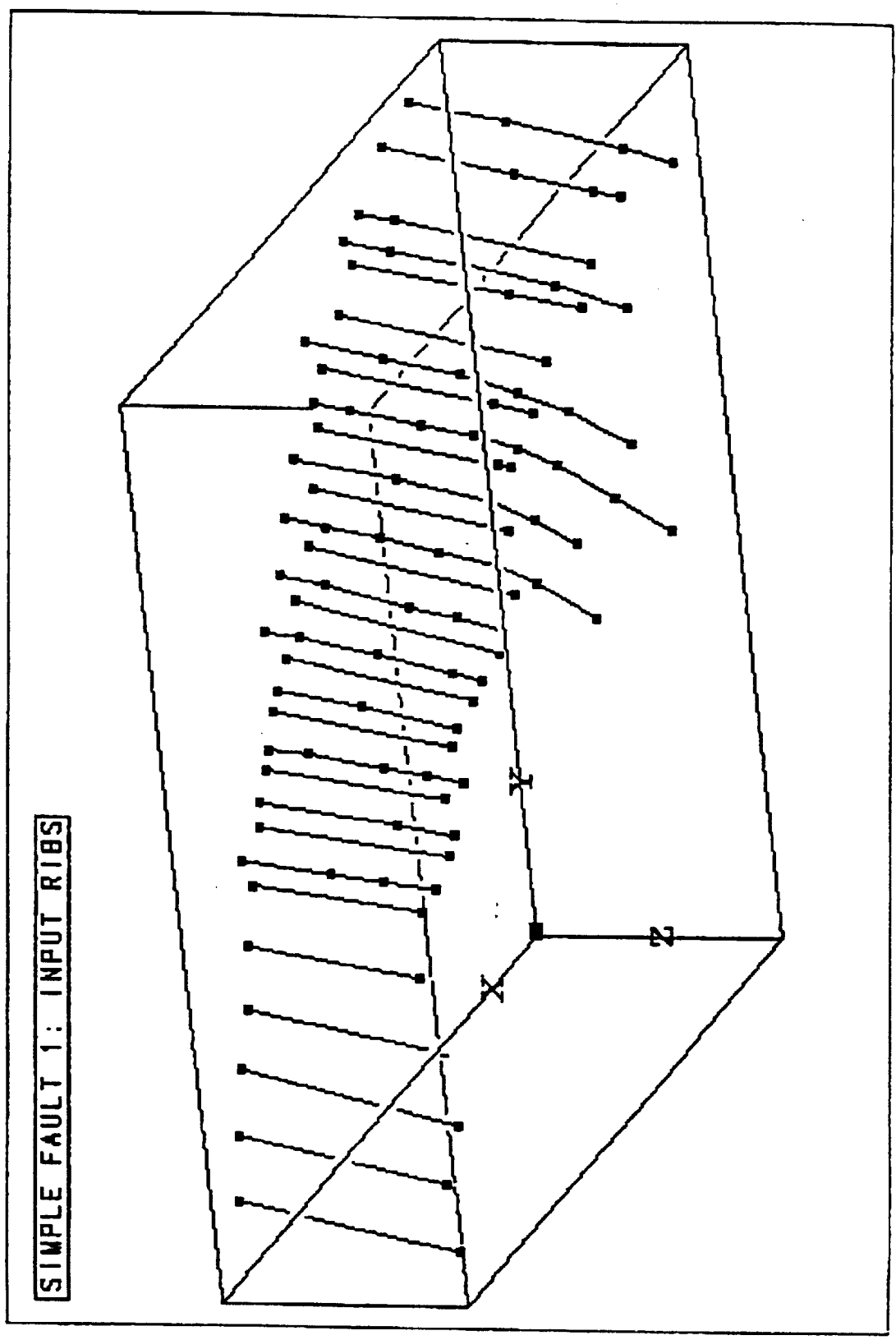
FIG. 34 Shows ribs (segments) of a simple fault.
Figure 35:
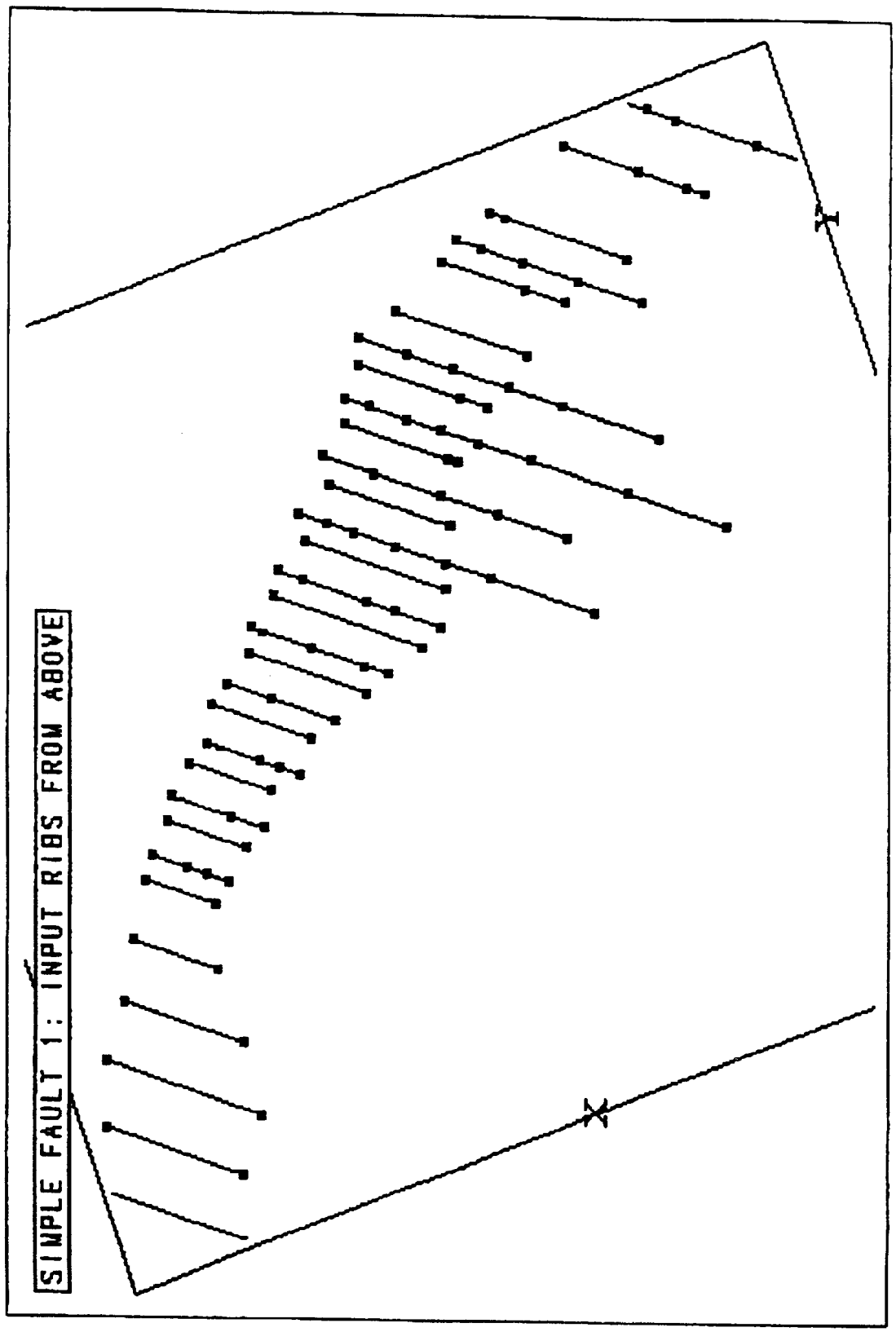
FIG. 35 Shows simple fault ribs viewed from above.

A simple fault is one which shows relatively little change of strike direction and accordingly has been interpreted as a set of fault segments all taken on parallel vertical seismic sections. FIG. 34 shows such a simple fault segment set based on real data and manual interpretation. The map view of the segments shown in FIG. 35 confirms the parallel nature of the planes of these ribs.

Processing

Figure 36:
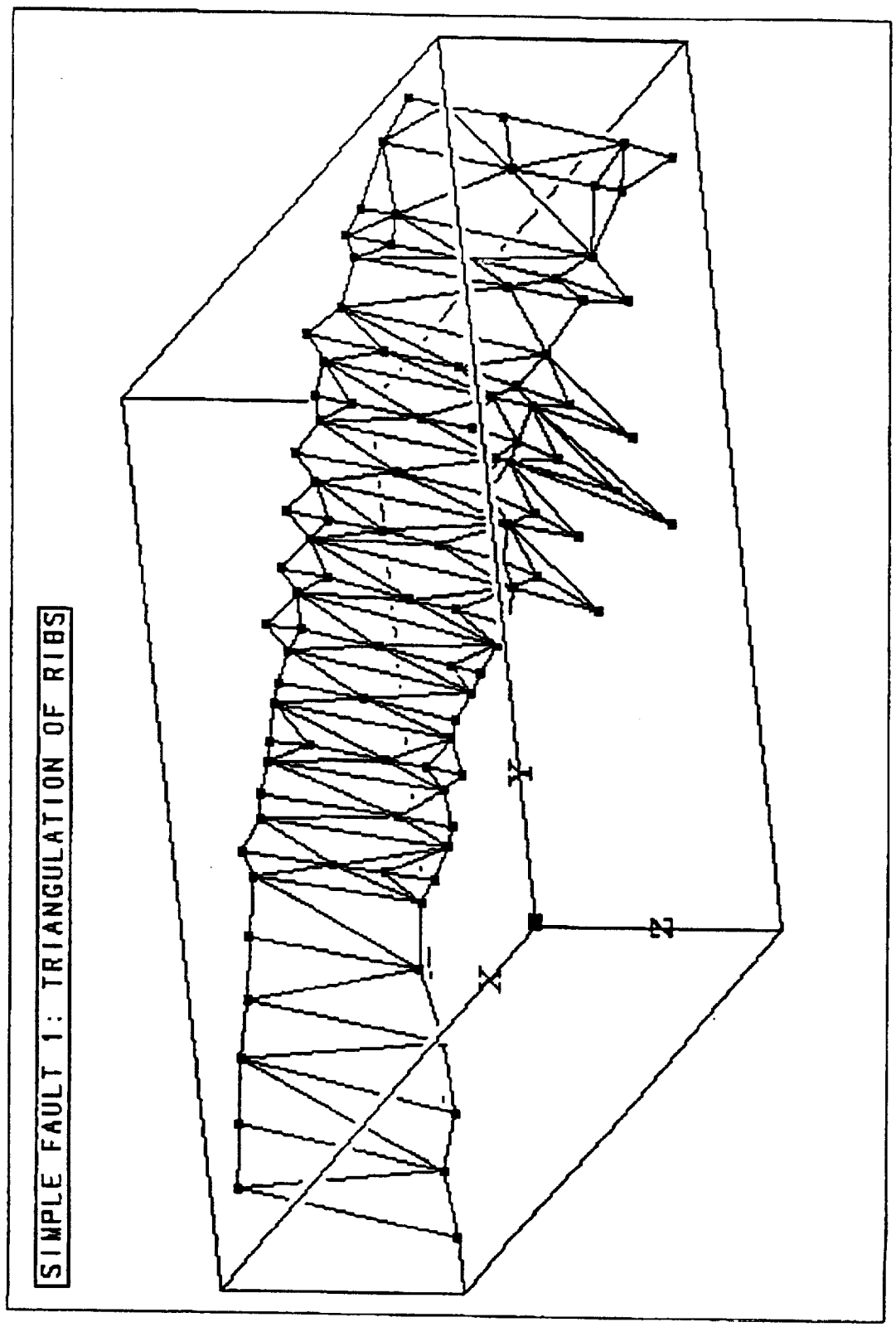
FIG. 36 Shows triangulation of simple fault ribbing.
Figure 37:
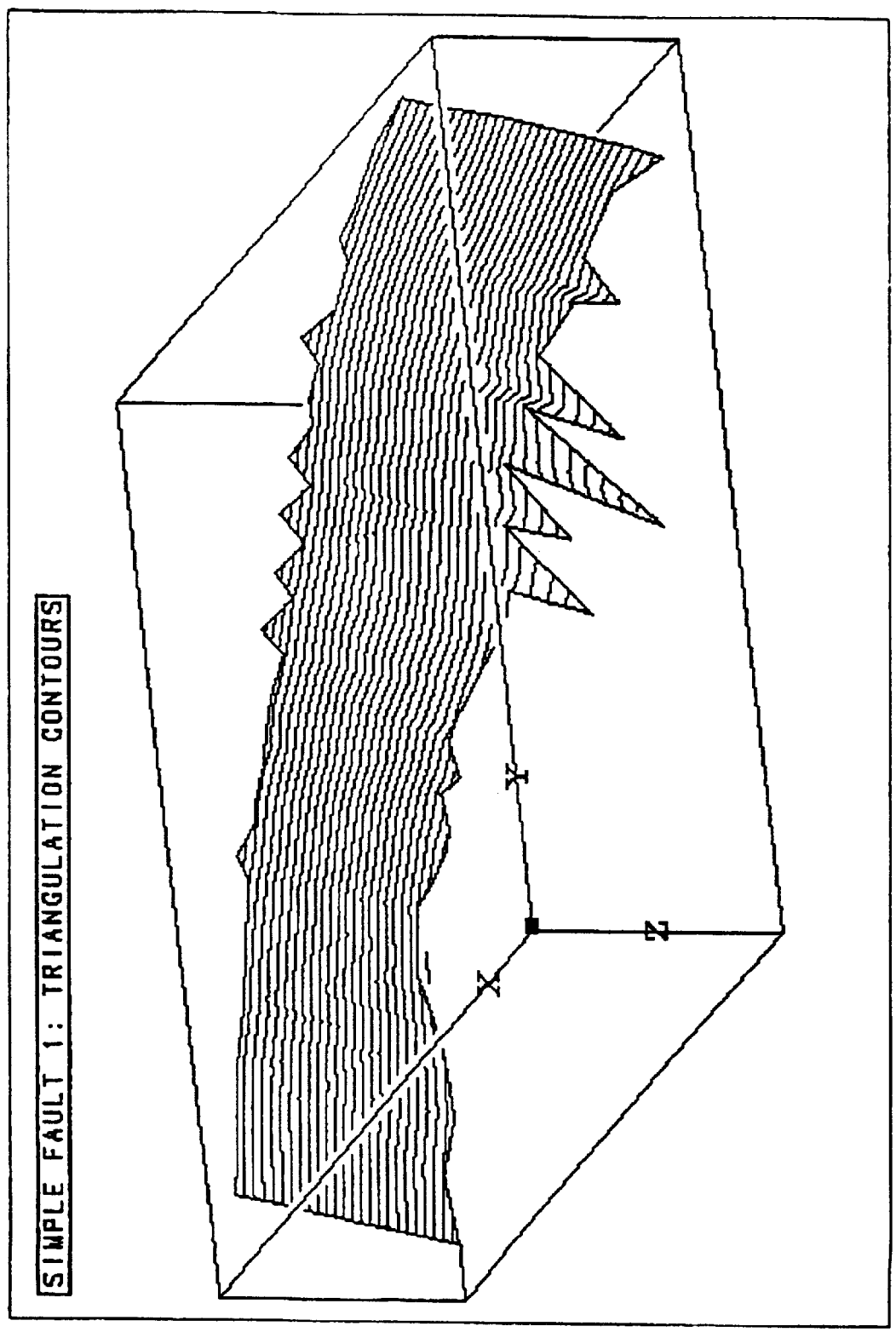
FIG. 37 Shows contouring of simple fault triangulation.

Since the ribs are recognized as being on parallel vertical planes, their sequencing simply follows the sorting of the distances of these planes from the origin. FIGS. 36 and 37 show the triangulation and contouring results respectively.

Comments

The relation of this rib triangulation of this invention (to that presently produced by Landmark's SeisWorks program) can be compared even though the corresponding SeisWorks results are not available.

The SeisWorks Thiessen triangulation takes nlog(n) time where n is total node count, whereas rib triangulation is linear in n. This distinction may be unimportant for small node counts as in the present example, but cases of large n exist.

Regarding quality of product, the Thiessen triangulation is forced to triangulate out to the convex hull of the ribs as viewed in the natural coordinate system. This commonly induces spurious triangles, especially along the top and bottom of the fault. SeisWorks has logic attempting to trim off such triangles, but that logic is not always fully effective, often leaving erroneous triangles which stretch across many ribs and which may have normals pointing in obviously wrong directions.

The rib triangulation shows no such defect. Every triangle is confined between two adjacent rigs. Consequently the top and bottom edges of the surface exactly track the sequential tops and bottoms of the ribs. In fact users might desire smoothing of fault edges, which would be an easy add-on functionality for RibFill.

2.12 Complex Fault

Ribs

Figure 38:
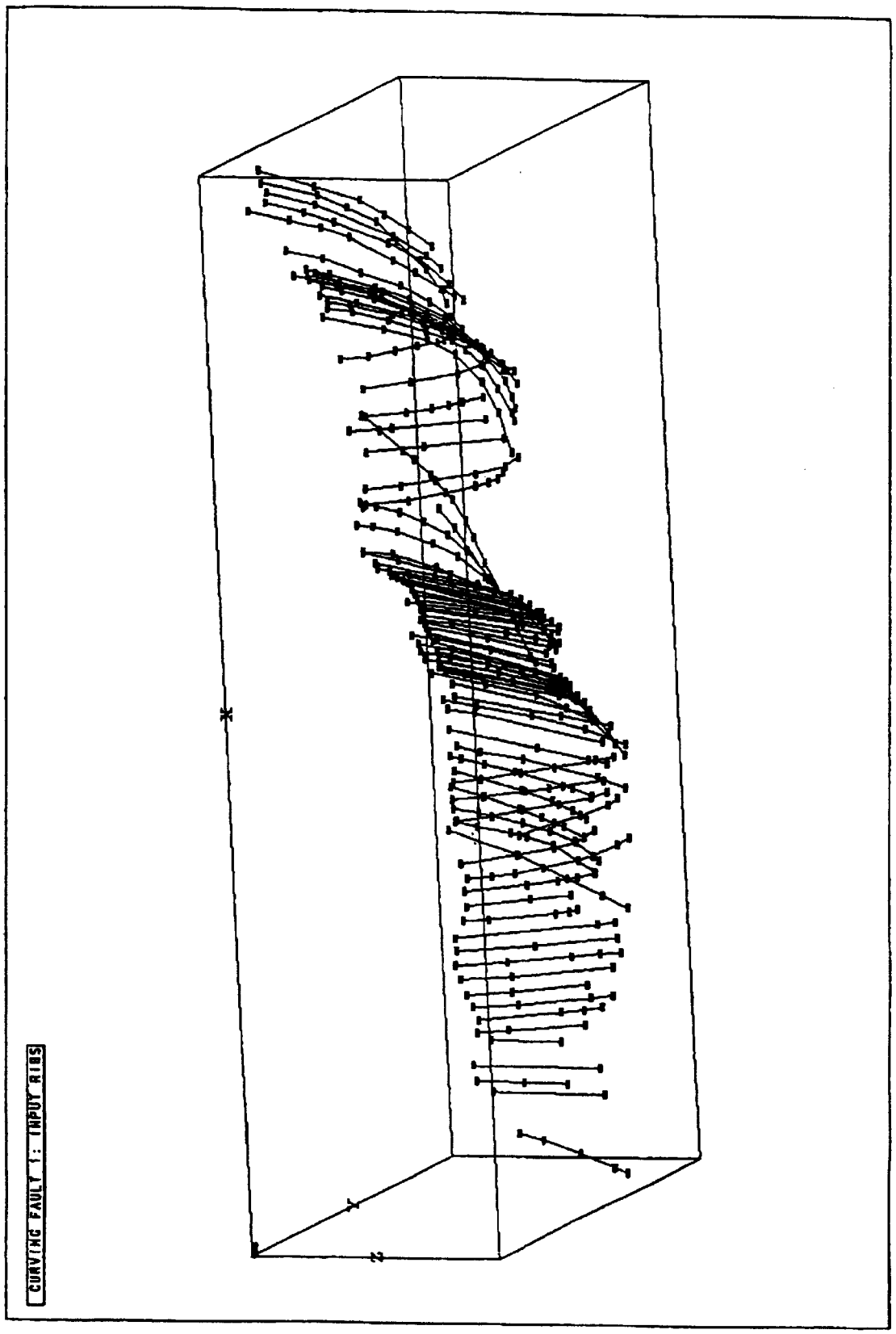
FIG. 38 Shows ribs of a complex fault.
Figure 39:
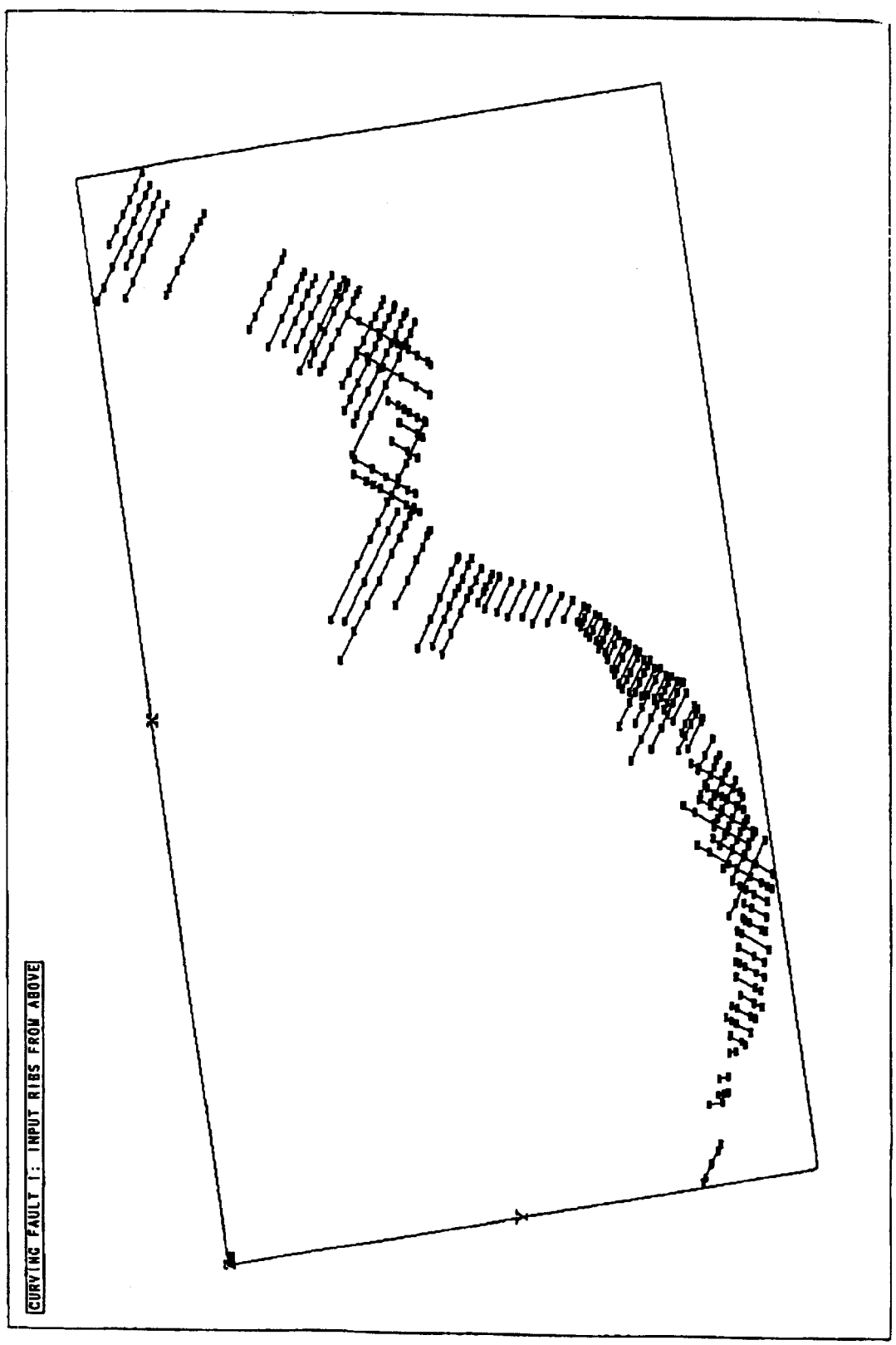
FIG. 39 Shows map view of complex fault ribs.

A complex fault, as defined here, is generally one of considerable length showing substantial change of strike direction, and consequently one which has been interpreted as a set of fault segments on non-parallel vertical seismic sections, commonly sections at right angles to each other. Segments from a particularly serious case are considered here where such segments may cause major problems in SeisWorks triangulation. The segments, 92 in all, are shown in FIG. 38 and in map view in FIG. 39. The map view shows that the ribs crisscross each other along two different stretches of the fault.

Processing

A sequencing of the ribs is first searched for which will associate nearby ribs with each other while leaving the problem of crisscrossing for later treatment. It was found that the rib centroids were too erratic to provide a sequencing under the algorithm described in Section 2.5. What did work however was to take a plane at an average z depth, intersect the plane with each rib, and use those intersections as pseudo-centroids in that sequencing algorithm.

Figure 40:
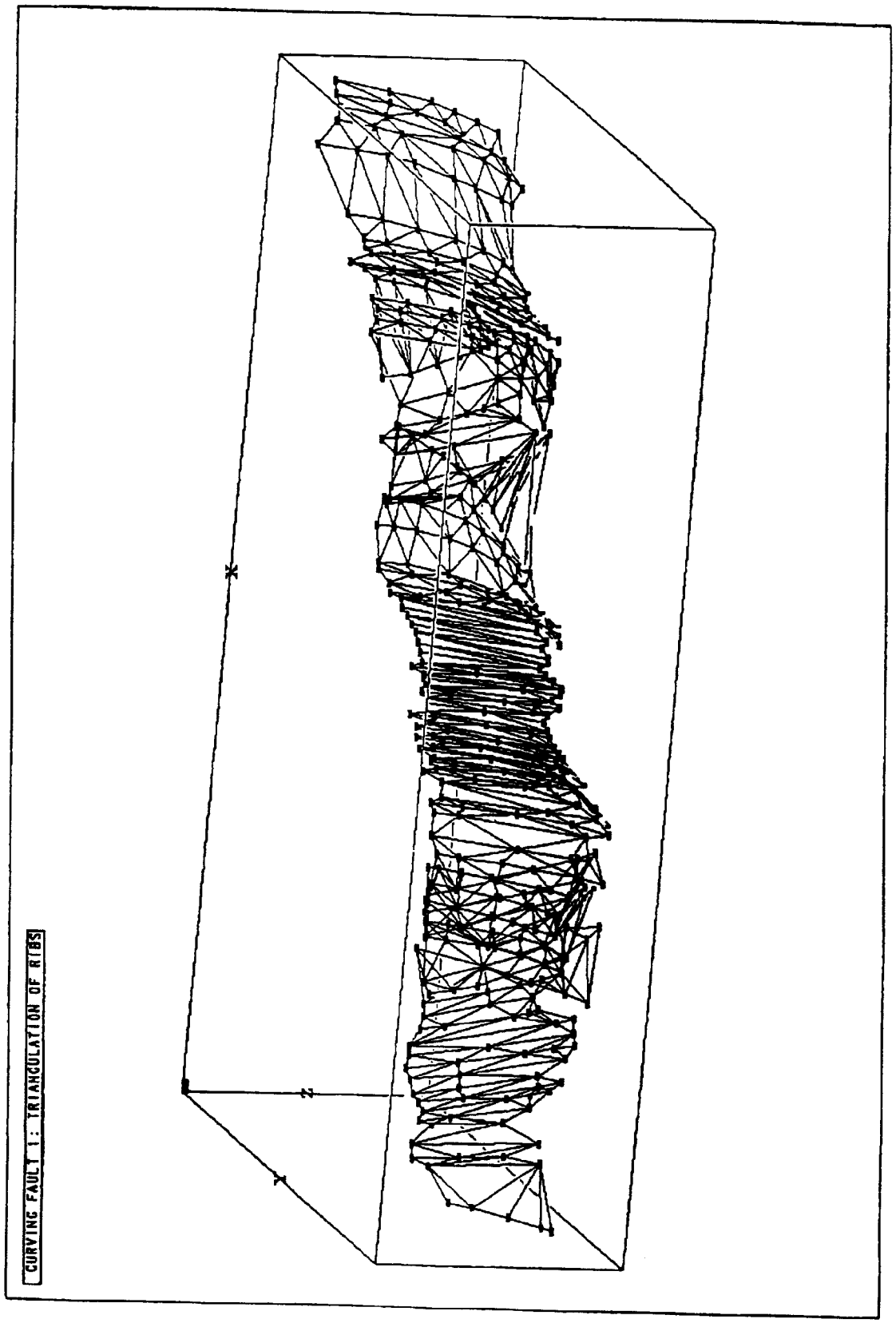
FIG. 40 Shows triangulation of complex fault ribs.
Figure 41:
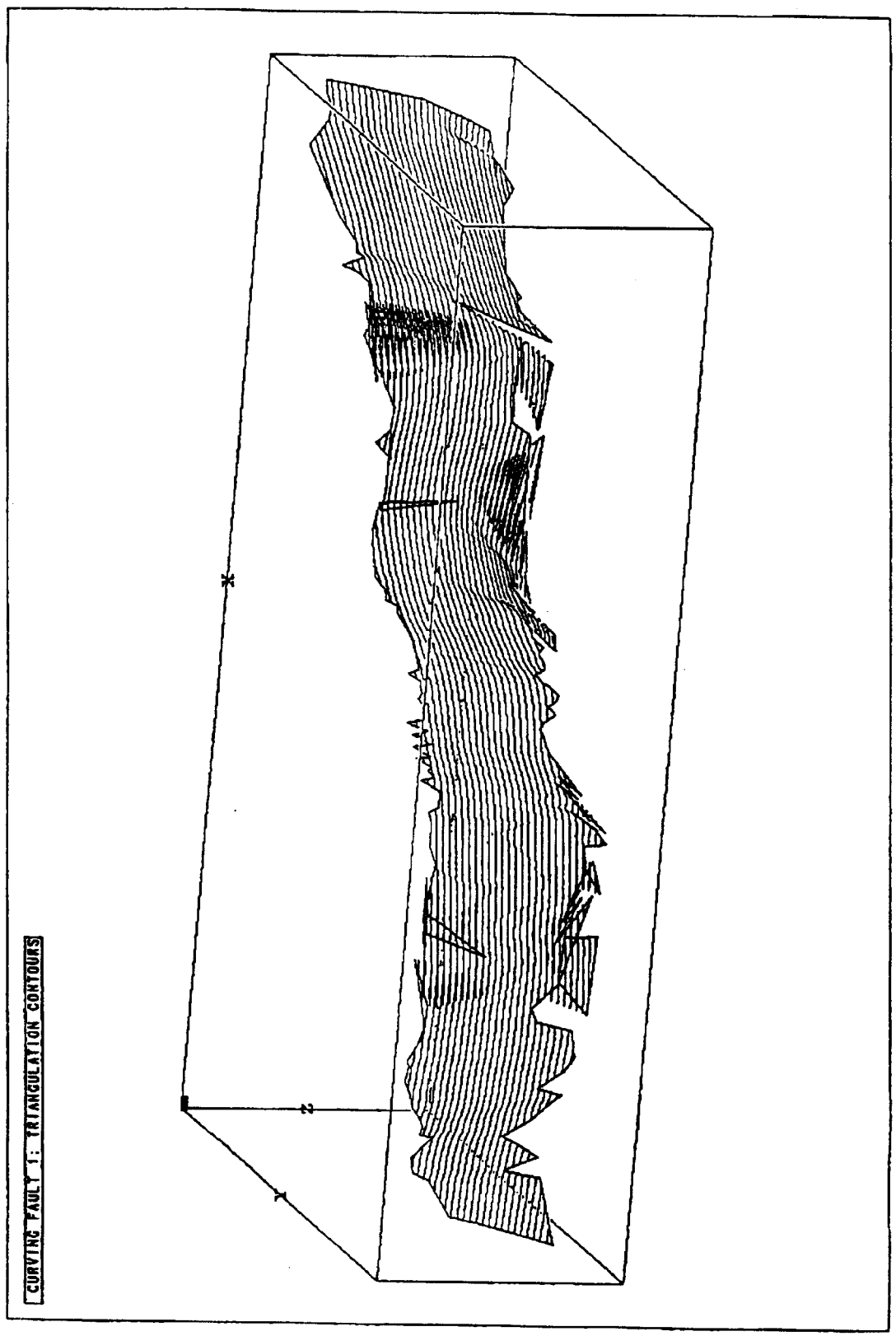
FIG. 41 Shows contouring of complex fault triangulation.

Once having this fairly reasonable sequence the program proceeds with the rib triangulation and contouring to examine the symptoms produced by rib crisscrossing in the two stretches where the crisscrossing occurs. FIG. 40 shows this triangulation which looks quite complicated and FIG. 41 shows the contouring which looks relatively uncomplicated. Why? The disparity of complication?.

Figure 42:
FIG. 42 Shows complex fault contouring viewed from above.

What appears to be happening in the crisscross zones is that the triangulations are folding back and forth on themselves very tightly, so that in those zones little stacks of nearly coincident surfaces are produced. Such an interpretation is born out by FIG. 42 which shows a top view of the contours looking more or less straight down the fault.

Based on these observations there are several different approaches to the rib-crossing problem. The simplest of these approaches is as follows.

Determine a natural coordinate plane for the fault. At every pseudo-centroid x,y location erect a vertical plane at right angles to the natural plane of the fault. Intersect each such plane with the surface produced by the rib triangulation described above. If that intersection is one simple polyline, then that polyline is used as a replacement for the original rib passing through the pseudo-centroid. If not, a least squares polynomial in z is found which best fits the complex of polylines created by the intersection. Next, that polynomial is sampled appropriately, and use samples are used to create a polyline to replace the original rib at that pseudo-centroid.

This gives us absolutely non-crisscrossing ribs which may be triangulated are used as before.

Comments

The rib crisscrossing problem associated with complex faults may readily be the solution to partial or complete (as outlined above) rib replacement approaches, and surfaces every bit as good as those for simple faults should be obtained.

What is claimed is:

1. A method for modeling in a x-y-z coordinate system a complex structure of the earth, where a complex structure has surfaces which are multiple-valued, comprising the steps of collecting and digitally storing seismic data traces in a data base of a volume of the earth of which said complex structure is contained, and with a computer program, (a) drawing a plurality of rib lines directly in said x-y-z system without translation to or from another coordinate system which outline the general shape of said structure, (b) selecting a first rib line and a second rib line of said plurality of rib lines, (c) first drawing a first plurality of preselected unconnected nodes on said first rib line and a second plurality of preselected unconnected nodes on said second rib line, and then (d) defining a rung between said first and second rib lines by connecting a line between a first preselected unconnected node on said first rib line to a first preselected unconnected node on said second rib line, thereby creating a rung between said first and second rib lines with said first and second preselected nodes being designated first and second connected nodes, (e) identifying a third preselected unconnected node on one rib line of either said first rib line or said second rib line which is nearest a connected node of either said first rib line or said second rib line, (f) connecting said third preselected unconnected node with said connected node of said other rib line, thereby causing said third preselected unconnected node to be a connected node and creating a second rung and a triangle shape between said first, second and third connected nodes, and (g) repeating steps (e) and (f) until all the preselected nodes of said first and second rib lines have been connected to another node to form a triangulated surface between said first and second rib lines, and further comprising the steps of (h) selecting a third rib line which is generally adjacent said second rib line and redefining said second rib line as said first rib line and defining said third rib line as said second rib line, (i) repeating steps (c) through (g) above until all of said preselected nodes of said third rib line and said second rib line have been connected to another node, and (j) repeating steps (h) and (i) above until all sets of two adjacent rib lines of said plurality of rib lines have been processed, and (k) graphically displaying in said x-y-z coordinate system each triangulated surface between sets of two adjacent rib lines to display said structure.

2. The method of claim 1, wherein, the method further comprises the step of contouring said triangulated surfaces with contour planes perpendicular to the z axis.

3. The method of claim 1 wherein, said complex structure is a subterranean formation, and said rib lines are generated by a plurality of vertical seismic sections pivoted at increments about a vertical pivot line through the center of said seismic data traces through said formation.

4. The method of claim 3 wherein, said subterranean formation is a salt dome.

5. The method of claim 1 wherein, said complex structure is a subterranean formation, and said rib lines are generated by the step of defining a plurality of parallel vertical sections perpendicular to an axis of a x-y-z coordinate system.

6. The method of claim 5 wherein, said subterranean formation is a salt dome.

7. The method of claim 5 wherein, said subterranean formation is a stream channel.

8. The method of claim 1 wherein, said complex structure is a subterranean formation, and said rib lines are generated by the steps of defining a plurality of time slice sections through said seismic data traces and defining a closed pologon for each of said time slice sections.

9. The method of claim 8 wherein, said subterranean formation is a salt dome.

10. The method of claim 1 wherein, said complex structure is an artificial subterranean torus, and said rib lines are generated by the step of defining a plurality of vertical section circles with centers disposed about a horizontal circle.

11. The method of claim 1 wherein, said complex structure is a volcano and said rib lines are generated by 3D circles lying on planes normal to a curving axis of such a volcano.

12. The method of claim 1 wherein, said complex structure is a simple fault and said rib lines are generated from parallel vertical seismic sections through said simple fault.

13. The method of claim 1 wherein, said complex structure is a complex fault of a length showing substantial change of strike directions, and said rib lines are generated from non-parallel vertical seismic sections through said complex fault.

14. A computer program for modeling in a x-y-z coordinate system a complex structure of the earth where the complex structure has multi-valued surfaces, comprising, a computer data base of seismic data traces of a volume of the earth of which said complex structure is contained, a first computer program which
- (a) provides a plurality of rib lines from a manual drawing of same directly in an x-y-z coordinate system without translation to or from another coordinate system, said rib lines outlining the general shape of said structure,
- (b) selects a first rib line and a second rib line of said plurality of rib lines,
- (c) first defines a first plurality of preselected unconnected nodes on said first rib line and a second plurality of preselected unconnected nodes on said second rib line,
- (d) defines a rung between said first and second rib lines by connecting a line between a first preselected unconnected node on said first rib line to a first preselected unconnected node on said second rib line, thereby creating a rung between said first and second rib lines with said first and second nodes being designated first and second connected nodes,
- (e) identifies a third preselected unconnected node on one rib line of either said first rib line or said second rib line which is nearest a connected node of either said first rib line or said second rib line,
- (f) connects said third preselected unconnected node with said connected node of said other rib line, thereby causing said preselected unconnected node to be a connected node and creating a second rung and a triangle shape between said first, second and third connected nodes, and
- (g) repeats steps (e) and (f) until all the preselected nodes of said first and second rib lines have been connected to another node to form a triangulated surface between said first and second rib lines, and forms a triangulated surface between said first and second rib lines,
- (h) selects a third rib line which is generally adjacent said second rib line and redefines said second rib line as said first rib line and defining said third rib line as said second rib line,
- (i) repeats steps (c) through (g) above until all of said preselected nodes of said third rib line and said second rib line have been connected to another node, and
- (j) repeats steps (h) and (i) above until all sets of two adjacent rib lines of said plurality of rib lines have been processed, and a second computer program which graphically depicts each triangulated surface between sets of two adjacent rib lines to display said structure.

15. The computer program of claim 14 wherein, said structure is displayed on a x-y-z coordinate system, and said triangulated surfaces are contoured with contour planes perpendicular to the z axis.

16. The computer program of claim 14 wherein, said complex structure is a subterranean formation and said rib lines are generated by a plurality of vertical seismic sections pivoted at increments about a vertical pivot line through the center of said seismic data traces through said formation.

17. The computer program of claim 16 wherein, said subterranean formation is a salt dome.

18. The computer program of claim 14 wherein, said complex structure is a subterranean formation and said rib lines are generated by the step of defining a plurality of parallel vertical sections perpendicular to an axis of a x-y-z coordinate system.

19. The computer program of claim 18 wherein, said subterranean formation is a salt dome.

20. The computer program of claim 18 wherein, said subterranean formation is a stream channel.

21. The computer program of claim 14 wherein, said complex structure is a subterranean formation and said rib lines are generated by the steps of defining a plurality of time slice sections through said seismic data traces and defining a closed pologon for each of said time slice sections.

22. The computer program of claim 21 wherein, said subterranean formation is a salt dome.

23. The computer program of claim 14 wherein, said complex structure is an artificial subterranean torus, and said rib lines are generated by the step of defining a plurality of vertical section circles with centers disposed about a horizontal circle.

24. The computer program of claim 14 wherein, said complex structure is a volcano and said rib lines are generated by 3D circles lying on planes normal to a curving axis of such a volcano.

25. The computer program of claim 14 wherein, said complex structure is a simple fault and said rib lines are generated from parallel vertical seismic sections through said simple fault.

26. The computer program of claim 14 wherein, said complex structure is a complex fault of a length showing substantial change of strike directions, and said rib lines are generated from non-parallel vertical seismic sections through said complex fault.

* * * * *

UNITED STATES PATENT AND TRADEMARK OFFICE
CERTIFICATE OF CORRECTION

PATENT NO. : 6,373,486 B1 Page 1 of 1
DATED : April 16, 2002
INVENTOR(S) : Simpson It is certified that error appears in the above-identified patent and that said Letters Patent is hereby corrected as shown below:

<u>Column 9,</u>
Line 15, delete "comers", insert -- corners --
Line 32, delete "comers", insert -- corners --
Line 32, delete "comer", insert -- corner --
Line 34, delete "comers", insert -- corners --
Line 35, delete "corners", insert -- corner --
Line 40, delete "comer", insert -- corner --
Line 42, delete "comers", insert -- corners --
Line 44, delete "comers", insert -- corners --

Signed and Sealed this

Eighteenth Day of June, 2002

*Attest:*

JAMES E. ROGAN
*Attesting Officer*     *Director of the United States Patent and Trademark Office*